(12) United States Patent
Bauer et al.

(10) Patent No.: US 6,370,548 B1
(45) Date of Patent: Apr. 9, 2002

(54) SYSTEM AND METHOD FOR ACHIEVING LOCAL NUMBER PORTABILITY

(75) Inventors: Deborah Bauer, Leesburg, VA (US); Ross Button, Carleton Place (CA); Mike Cavanagh, Woodlawn (CA); Susan Jane McQuigge Ernst, Gloucester (CA); Kevin Germann, Gatineau (CA); Ralph Holmes, Glenn Dale, MD (US); Samuel S. Howlette, Great Falls, VA (US); William Kalyn, Kanata (CA); Steve Sauve, Orleans (CA); Francis C. Sommers, Ottawa (CA)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/169,491

(22) Filed: Oct. 9, 1998

Related U.S. Application Data

(63) Continuation of application No. 08/897,906, filed on Jul. 21, 1997.

(51) Int. Cl.⁷ .............................................. G06F 17/30
(52) U.S. Cl. ......................... 707/204; 707/10; 707/203
(58) Field of Search ..................... 707/10, 204, 203; 379/93.23, 204, 207, 210, 219, 201.01, 26.01; 455/445

(56) References Cited

U.S. PATENT DOCUMENTS

| 5,218,632 A | 6/1993 | Cool |
| 5,325,290 A | 6/1994 | Cauffman et al. |
| 5,333,183 A | 7/1994 | Herbert |
| 5,384,822 A | 1/1995 | Brown et al. |
| 5,546,574 A | 8/1996 | Grosskopf et al. |
| 5,566,235 A | 10/1996 | Hetz |

(List continued on next page.)

FOREIGN PATENT DOCUMENTS

EP      0710042 A2      5/1996

OTHER PUBLICATIONS

Lane, "Data Communications Software Design", Boyd & Fraser Publishing Company, 1985, pp. 116–117.*
Newton, "Newton's Telecom Dictionary," Flatiron Publishing, Inc., 1994, p. 714.

*Primary Examiner*—Wayne Amsbury
*Assistant Examiner*—Thuy Pardo

(57) ABSTRACT

A method, system and computer program product for achieving local number portability. Two databases are interfaced so that message data from one database is selectively passed to the other database and processed for transfer to corresponding requesting software applications. More specifically, a regional interface broadcast agent is interfaced to an interface broadcast agent repository so that message data from the regional interface broadcast agent is selectively passed to the interface broadcast agent repository.

18 Claims, 23 Drawing Sheets

U.S. PATENT DOCUMENTS

| | | |
|---|---|---|
| 5,606,600 A | 2/1997 | Elliot et al. |
| 5,625,681 A | 4/1997 | Butler, II |
| 5,625,816 A | 4/1997 | Burdick et al. |
| 5,703,939 A | 12/1997 | Bushnell |
| 5,715,303 A | 2/1998 | Marks et al. |
| 5,717,745 A | 2/1998 | Vijay et al. |
| 5,717,749 A | 2/1998 | Sneed, Jr. et al. |
| 5,734,705 A | 3/1998 | Scholossman et al. |
| 5,757,895 A | 5/1998 | Aridas et al. |
| 5,761,272 A | 6/1998 | Williams et al. |
| 5,764,745 A | 6/1998 | Chan et al. |
| 5,765,172 A | 6/1998 | Fox |
| 5,774,532 A | 6/1998 | Gottlieb et al. |
| 5,784,443 A | 7/1998 | Chapman et al. |
| 5,787,147 A | 7/1998 | Gundersen |
| 5,793,861 A | 8/1998 | Haigh |
| 5,809,108 A | 9/1998 | Thompson et al. |
| 5,832,068 A | 11/1998 | Smith .................... 379/113 |
| 5,835,497 A | 11/1998 | Litzenberger et al. |
| 5,835,757 A | 11/1998 | Oulid-Aissa et al. |
| 5,854,834 A | 12/1998 | Gottieb et al. |
| 5,883,948 A | 3/1999 | Dunn |
| 5,896,440 A | 4/1999 | Reed et al. |
| 5,901,215 A | 5/1999 | Dezenno |
| 5,903,632 A | 5/1999 | Brandon |
| 5,910,983 A | 6/1999 | Dezonno et al. |
| 5,912,962 A | 6/1999 | Bosco |
| 5,933,489 A | 8/1999 | Sensabaugh et al. |
| 5,940,492 A | 8/1999 | Galloway et al. |
| 5,949,867 A | 9/1999 | Sonnenberg |
| 5,951,654 A | 9/1999 | Avsan et al. |
| 5,978,464 A | 11/1999 | Sonnenberg |
| 5,987,114 A | 11/1999 | Sonnenberg |
| 6,047,045 A | 4/2000 | Bauer et al. ................... 379/15 |
| 6,058,175 A | 5/2000 | Schultz |
| 6,064,887 A | 5/2000 | Kallioniemi et al. |
| 6,067,354 A | 5/2000 | Bauer et al. |
| 6,122,362 A | 9/2000 | Smith et al. |
| 6,169,793 B1 | 1/2001 | Godwin et al. ............. 379/207 |

* cited by examiner

SYSTEM AND METHOD FOR ACHIEVING LOCAL NUMBER PORTABILITY

CROSS-REFERENCE TO RELATED APPLICATIONS

This application is a continuation of U.S. patent application Ser. No. 08/897,906, filed Jul. 21, 1997, now pending and entitled "System and method for Achieving Local Number Portability," incorporated herein by reference.

BACKGROUND OF THE INVENTION

1. Field of the Invention

The present invention relates generally to field telecommunications and more specifically to a method, system and computer program product for achieving local number portability. The present invention relates more specifically to a method, system and computer program product for interfacing redo databases so that message data from one database is selectively passed to the other database and processed for transfer to corresponding requesting software applications. The present invention relates more specifically to a method, system and computer program product for interfacing a regional interface broadcast agent to an interface broadcast agent repository so that message data from the regional interface broadcast agent is selectively passed to the interface broadcast agent repository.

2. Discussion of the Background

Without limiting the invention, its background is described in connection with local telephone services and providers of such services. In general, the telecommunications industry has evolved into a highly competitive and sophisticated network of equipment manufacturers and service providers. Since the early 1980s, the industry has seen a shift from pure analog techniques over copper wire to digital techniques over optical fiber. Today, customers can choose from a large array of consumer telecommunications services including local and long distance calling, 800 and 900 calling accounts, TCP IP (i.e. the "Internet") and others.

Typically, a telecommunications customer obtains access to such services by establishing an account with a service provider. The service provider, in turn, will assign to the customer a telephone number for inbound calls or provide the customer with a dial-up number for outbound calls. For example, the number can be the local telephone number where the customer can be reached such as a home or business. The number can also be the local dial-in to an automated system for a switched connection to a network element such as a domain server. Other examples include, but are not limited to, a customer's facsimile machine, cell phone number or voice mail.

At the same time industry deregulation has brought about the entry of multiple service providers within single geographic regions. In addition to competition, the number and variety of telecommunications services continues to increase. Typically, a category of service is tied to a single unique number so that any one customer may consume a host of numbers to accommodate a host of services. Thus, a common situation has evolved wherein a single customer will have a home number, an office number, a facsimile machine number, a cell phone number, an Internet account number and possibly others.

Today's service providers employ advanced information technology systems using sophisticated equipment such as routers, switches and digital cross-connects. At a minimum, the equipment must be configured to ensure calls reach their destination regardless of the service provider. While standards and communications protocols have been adopted by the industry, cooperation amongst service providers has been critical to implementing a reliable network. Today, a customer can place a clear noise free call from almost anywhere in the world.

The Public Switched Telephone Network ("PSTN") comprises the telecommunications backbone for most voice/data traffic in the world. For most local and long distance telephone calls a local telephone company acts as a local entry point to the PSTN. Typically, a Local Routing Number ("LPN") is used to route the call from a portion of origination to a point of destination on the PST. This is true regardless of who is servicing the call at either point.

This infrastructure, however, does not always accommodate a change in the service needs of an end customer. For example, often a customer desires to switch service providers to take advantage of a more attractive rate plan. The problem lies in that the customer is not guaranteed to maintain the same local number even if the customer remains at the same location. Thus, until the present invention, there was no way to port a customer's number from one service provider to another within the same local region.

In short, as competition for communications services has grown so has the value attached to a customer's telephone number. At present, call routing is based on a number associated with the switch used to handle the local call. Moreover, service providers have not developed a means for reliable call routing when a switch from one provider to another is made. Until the present invention, the only solution was to assign a new telephone number not already in use by another customer.

While long distance carriers have enacted portability solutions on a regional or even national basis for certain classes of services, such as 800 and 900 accounts, the local portability problem has not, until the present invention, been squarely addressed. Moreover, prior art efforts at local number portability have not been widespread. For example, an industry task force was formed, pursuant to the Illinois Commerce Commission Order on Customers First Plan (Docket 94-0096 dated Apr. 7, 1995), to develop a permanent number portability solution for Illinois. While the task force made progress in defining the problem and resolving certain issues related to implementing local number portability, it did not resolve the problem on a nationwide basis. Nor did the commission establish the hardware and software interfaces required to implement a nationwide portability solution.

Thus, a need exists for a system and method of achieving local number portability on a nationwide basis. A system and method of sharing a single telephone number over different local exchange carriers would fill a void not presently addressed by the prior art.

SUMMARY OF THE INVENTION

Accordingly, an object of this invention is to provide a novel method, system and computer program product for achieving local number portability.

It is a further object of this invention to provide a novel method, system and computer program product for providing portability of local numbers to end users.

It is a further object of this invention to provide a novel method, system and computer program product for interfacing two databases so that message data from one database is selectively passed to the other database and processed for transfer to corresponding requesting software applications.

It is a further object of this invention to provide a novel method, system and computer program product for interfacing a regional interface broadcast agent to an interface broadcast agent repository so that message data from the regional interface broadcast agent is selectively passed to the interface broadcast agent repository.

The present invention provides a hardware and software platform to effect the porting of local telephone numbers from one service provider to another. The systems and subsystems of the invention are designed to communicate with a Number Portability Administration Center and Service Management System ("NPAC/SMS") which receives and stores updated customer routing information and makes it available to participating service providers. The NPAC/SMS contains a record of all ported numbers and a history file of all transactions relating to the porting of a number.

The present invention provides a system for Local Number Portability ("LNPT") that submits service orders changes to a NPAC/SMS. In this regard, a Service Order Administration ("SOA") Subsystem is provided as means of entering and submitting services order changes to the NTAC/SMS via an interface that supports the retrieval and update of subscription, service provider and network information. A graphical user interface or a message-based interface to a service provider's upstream systems is used for this purpose.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Throughout the following description, the terms "interface", "line", "lines", "link", "communications link", "inbound link" and or "outbound link" can mean a channel, signal pathway, data path, circuit, or other similar mechanism whether physical, virtual or logical, which can be used for the transfer and communication of data by system applications and programs, whether external or internal. The terms "outbound link" and "inbound link" can also mean "pipes" in the context of the Oracle database structure and associated protocols, or "sockets" in the context of the UNIX operating system structure and associated protocols. The term "database" refers to a file of records having fields together with a set of operations on the records. Such conventions are well known to those skilled in the art.

Figure 1:
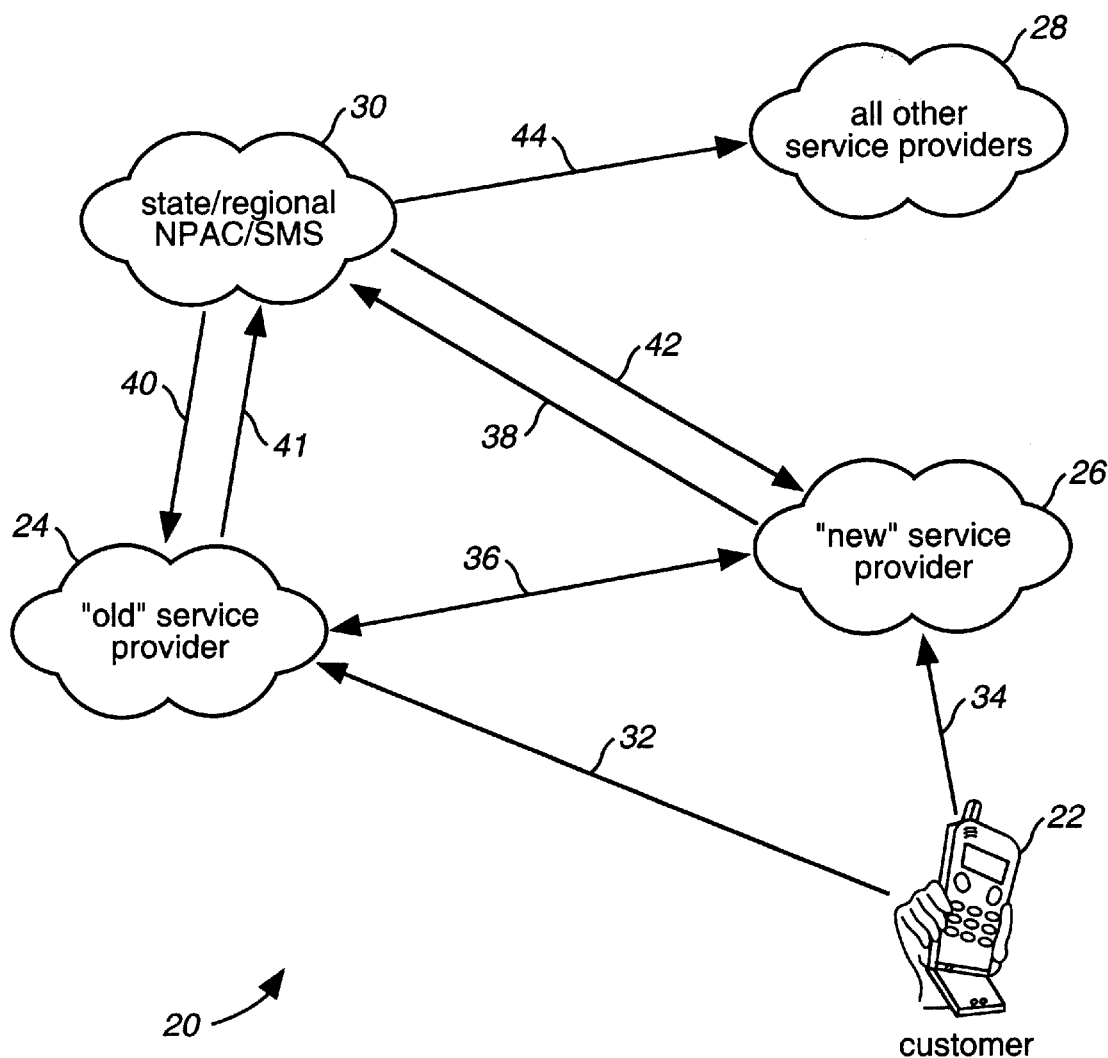
FIG. 1 is an overall process flow diagram for the novel method used to transfer a customer's port data from an old service provider to a new service provider according to one embodiment of the invention.

Referring now to the drawings, wherein like reference numerals designate identical or corresponding parts throughout the several views, and more particularly to FIG. 1 thereof, there is illustrated a flow diagram of a telephone number porting process denoted generally as 20 is shown. In general, the telephone number porting process 20, which achieves Local Number Portability ("LNP"), is used by a customer 22 to port or transfer his or her telephone number from an old service provider 24 to a new service provider 26. The customer 22 initiates the telephone number porting process 20 by submitting a port request to either the old service provider 24 as denoted by line 32, or the new service provider 26 as denoted by line 34, to arrange the port or transfer of the customer's telephone number from the old service provider 24 to the new service provider 26. The port request max, include a due date for the port transfer. Thereafter, the old service provider 24 and new service provider 26 arrange the port details for the customer's telephone number as denoted by line 36. The port details may include the due date for the port transfer.

Once the new service provider 26 obtains the customer's port request, the new service provider 26 notifies a Number Portability Administration Center and Service Management System ("NPAC/SMS") 30, which maintains a centralized regional number database for all customers in a given region, of the pending port or transfer, as denoted by line 38. Alternatively, the old service provider 24 can notify the APAC/SMS 30 of the pending port, as denoted by line 41.

Then the NPAC/SMS 30 receives a notification of a pending port or transfer, it performs certain validation checks and procedures. The NPAC/SMS 30 determines if it has received a notification from both of the involved service providers. If the NPAC/SMS 30 only received a notification from one of the involved service providers, either the old service provider 24 or the new service provider 26, the NPAC/SMS 30 will notify the service provider that failed to send a notification that the NPAC/SMS 30 is expecting such a notification. If the NPAC/SMS 30 receives the missing notification and the notifications from the two service providers 24 and 26 indicate agreement, the NPAC/SMS 30 activates the port of the customer's telephone number when the new service provider due date is reached or when the new service provider 26 sends an activation notice to the NPAC/SMS 30.

The NPAC/SMS 30 activates the port of the customer's telephone number by sending the new port data to the old service provider 24, as denoted by line 40, to the new service provider 26, as denoted by line 42, and to all other service providers 28, as denoted by line 44. This ensures proper call routing to the customer because all the service providers in the region 24, 26, and 28 can update their networking equipment accordingly.

If, during the validation process described above, the old service provider 24 failed to respond to the notification of the pending port, the NPAC/SMS 30 will log the failure to respond and allow the new service provider 26 to proceed with the port when the due date is reached. On the other hand, if it was the new service provider 26 that failed to respond, the NPAC/SMS 30 will log the failure to respond, cancel the notification and notify both service providers 24 and 26 of the cancellation. If there is any disagreement among any of the service providers 24, 26 or 28 as to who will provide the new service to the customer 22, the NPAC/SMIS 30 will place the notification in a "conflict" state and notify the conflicting service providers 24, 26 or 28 of the conflict status. The confliction of service providers 24, 26 or 28 will determine who will serve the customer 22 using appropriate internal conflict resolution procedures. If the conflict is resolved, the NPAC/SMS 30 will remove the notification from the "conflict" status once it is notified of the resolution after which the port process proceeds as described above. Alternatively, the new service provider 26 can cancel the port request.

The present invention incorporates significant advantages over the prior art in that it allows for the sending and receiving of porting data from regional databases, which are maintained at the NPAC/SMS 30, and provides a smooth transition from the old service provider 24 to the new service provider 26.

Figure 2:
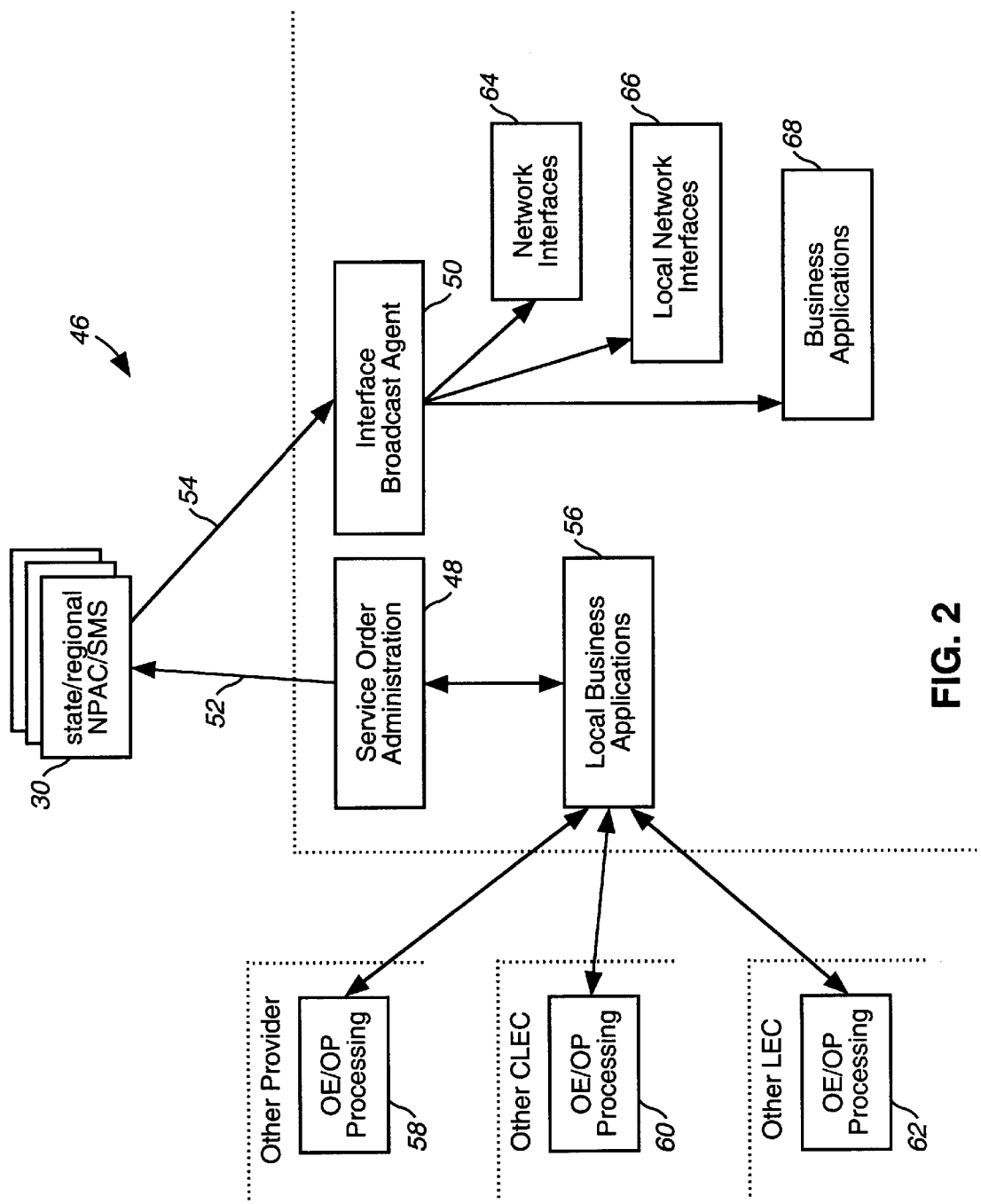
FIG. 2 is a high level block diagram for the novel interface between a Service Order Administration ("SOA"), an Interface Broadcast Agent ("IBA") and a regional number portability administration center according to one embodiment of the invention.

Turning now to FIG. 2, a block diagram of a system for achieving local number portability is shown and denoted generally as 46. The NPAC/SMS 30 is communicably linked to two functional subsystems, a Service Order Administration ("SOA") Subsystem 48 and an Interface Broadcast Agent ("IBA") Subsystem 50 via communication interfaces 52 and 54, respectively.

The SOA Subsystem 48 is the application responsible for sending the customer's port data from one service provider to another service provider. Likewise, the IBA Subsystem 50 is the application responsible for receiving, processing, storing and transmitting customer port data to the local networks. The SOA 48 and IBA 50 Subsystems work together with the NPAC/SMS 30 to send and receive customer porting data from regional call routing centers and data sources to more centralized information sources and applications. This configuration 46 provides a distributed architecture that allows the porting of data to the local applications and networking equipment maintained by service providers for appropriate call routing and processing.

The SOA Subsystem 48 is communicably linked to one or more local applications 56, which are maintained by the local service provider. Examples of the local applications 56 include, but are not limited to, residential and business lines for voice, data and fax communications. The local applications 56, in turn, are communicably linked and used by the customer Order Entry and Order Processing ("OE/OP") systems of other service providers 58, other Complex Local Exchange Carriers ("CLEC") 60, and other Local Exchange Carriers ("LEC") 62, depending on the existing network of service providers. The SOA Subsystem 48 acts as an intermediary between the local applications 56 and the NPAC/SMS 30, thus providing a smooth non-intrusive solution for local number portability.

Likewise, the IBA Subsystem 50 provides the interface between the regional NPAC/SMS 30 and a plurality of other network entry systems 64, 66 and 68. The specific functionality of the network entry systems 64, 66 and 68 may vary, but in general, they form a platform for receiving, storing, and routing customer port data. Examples of services that use the port data include local and long distance networks and 800 services.

For example, business applications 68 can comprise a database of records for all provider systems needing access to the customer porting data, such as the Automatic Number Identifier ("ANI") reference information system. The local network interfaces 66 can be an intelligent network architecture that supports routing queries during call processing. The network interface 64 can include the Metro Intelligent Network Architecture, which is sold by Northern Telecom, that forms a tie-in into available communications services. Such services may include an 800 or 900 service or other similar offerings that may require access to the port data through a regional toll switch network from the NPAC/SMS 30 for correct call servicing and routing.

Figure 3:
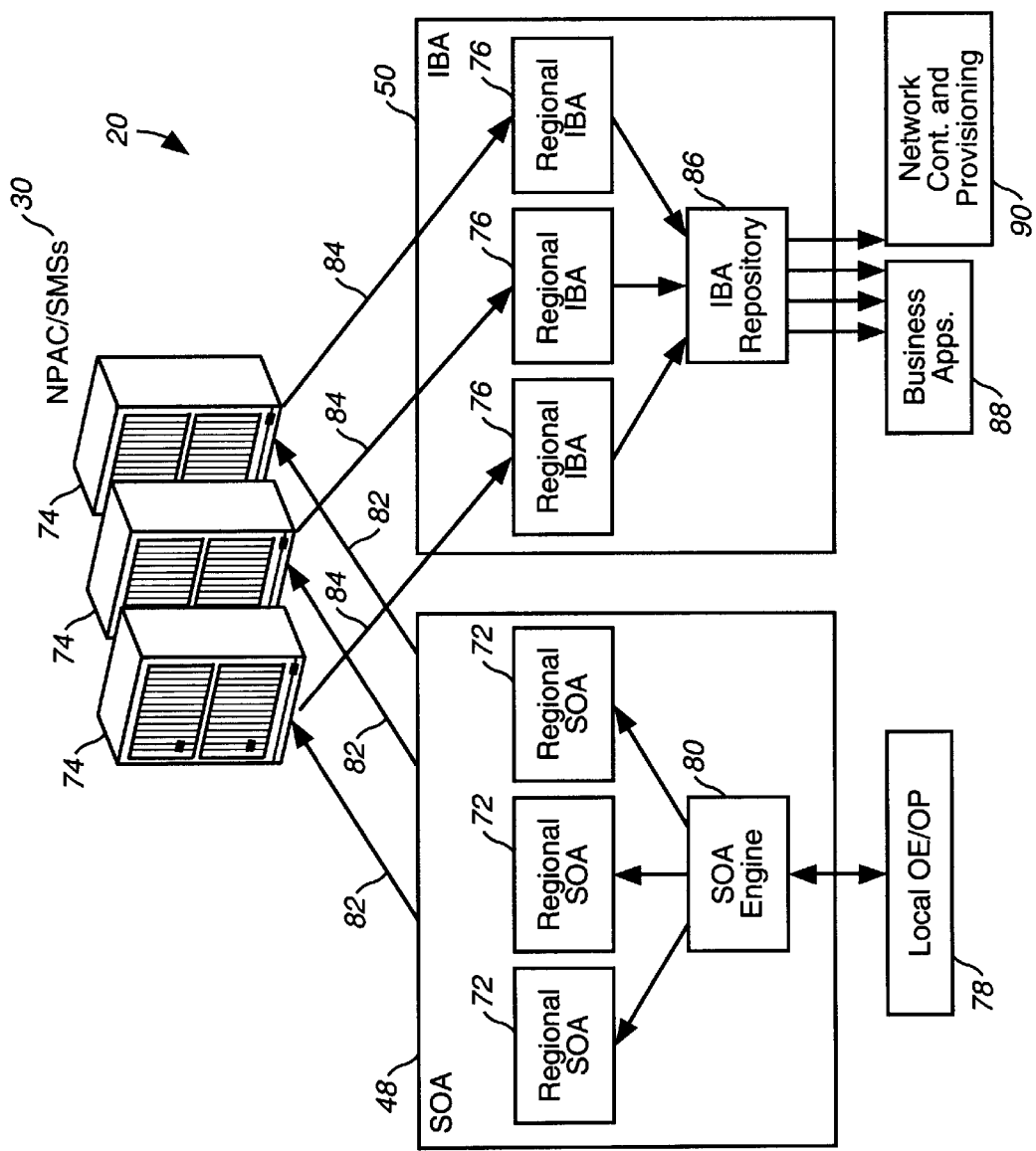
FIG. 3 is a block diagram of the novel SOA and IBA Subsystems and their interface to various business applications.
Figure 4:
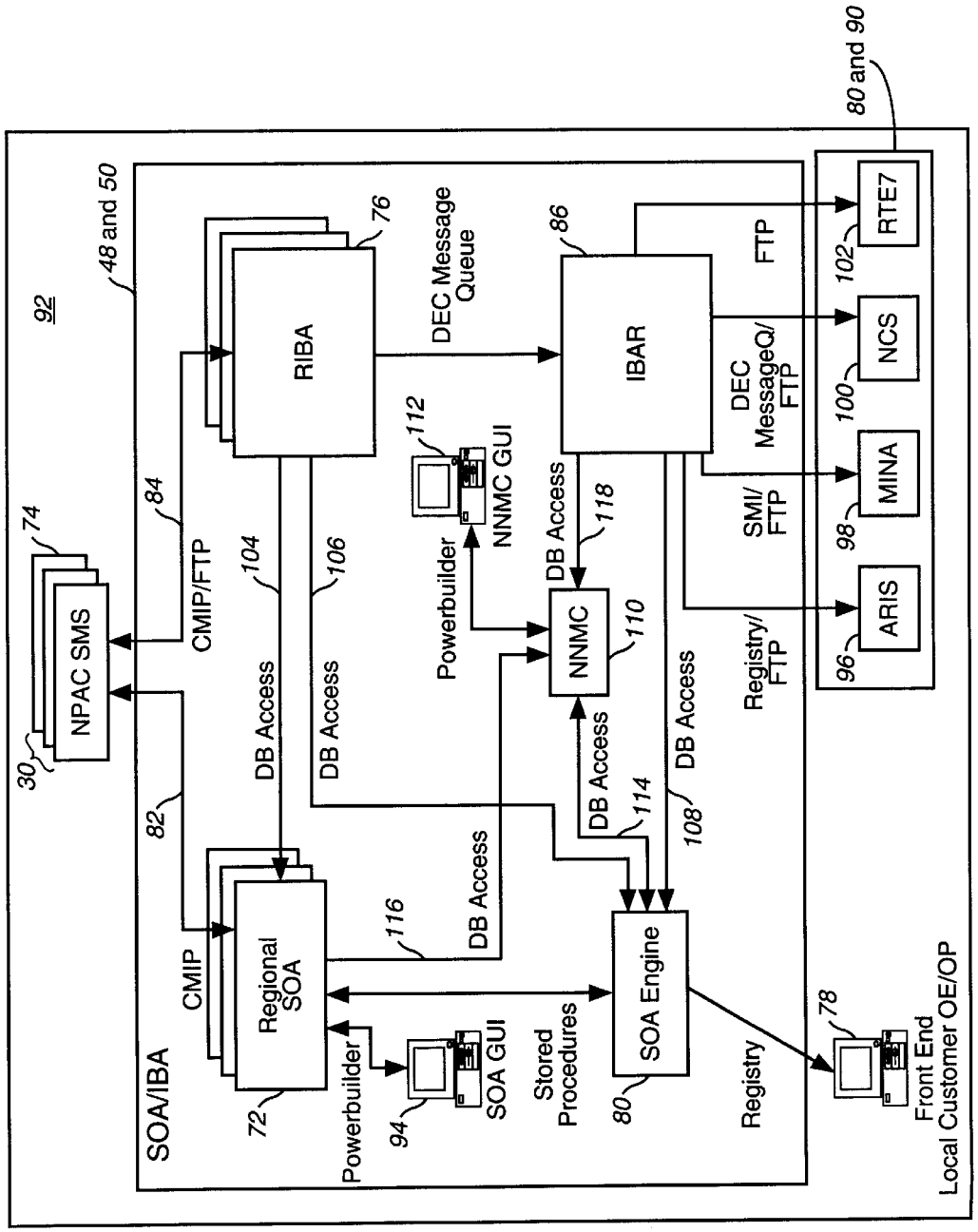
FIG. 4 is a block diagram of an alternative embodiment of the present invention with a novel National Network Management Center.

Turning now to FIGS. 3 and 4, the interaction between the NPAC/SMS 30, the SOA Subsystem 48 and the IBA Subsystem 50 will be described. The Local Number Portability System of FIG. 3 is denoted generally as 70. Whereas the Local Number Portability System of FIG. 4 is denoted generally as 92. Local Customer Order Entry and Order Processing ("OE/OP") Systems (collectively referred to as the "Front End") 78 send and receive LNP transactions or messages to and from a local SOA Engine 80. The SOA Engine 80 is an interface that routes the LNP transactions or messages to their appropriate destinations, such as the Regional SOA Subsystems 72 located in various parts of the country. In the case of FIG. 4, the SOA Engine 80 also receives and sends LNP transactions or messages from and to a SOA Graphical User Interface ("GUI") 94 and routes database queries to the RIBA ("Regional Interface Broadcast Agent") 76 and IBAR ("Interface Broadcast Agent Repository") 86 Subsystems. The Regional SOA 72 and SOA Engine 80 Subsystems form the SOA Subsystem 48, which provides the means for submitting customer service order changes to the Regional NPAC/SMSs 74.

Each Regional SOA Subsystem 72 is connected to a corresponding Regional NPAC/SMS 74 by communication interface 82, and all of the Regional NPAC/SMSs 74 form the NPAC/SMS 30. Similarly, each Regional NPAC/SMS 74 is connected to a corresponding RIBA Subsystem 76 by communication interface 84. Communication interfaces 82 and 84 conform to recognized industry standards, such as the North American Council Functional Requirements Specifications and the "NPAC/SMS Interoperable Interface Specification" by Lockheed Martin IMS Corporation. Communication interface 82 utilizes a Common Management Interface Protocol ("CMIP") and communication interface 84 utilizes both CMIP and File Transfer Protocols ("FTP").

Preferably some method of access control is provided to manage secure issues that arise from communications between the SOA 32 and RIBA 34 Subsystems and he NPAC/SMS 74. In one embodiment, an access control field is included in messages flowing between the SOA 32 and RIBA 34 Subsystems and the NPAC/SMS 74 and carries a digital signature. As is known by those skilled in the art, a digital signature is used for authentication purposes to guarantee the identity of the message sender. For example, the access control field can include the following information:

System ID: An identifier for the system that is using the interface. This is a key element in the authentication process. While it is passed in each Protocol Data Unit, it is only really important in the association establishment.

System Type: Identifies the kind of system that is connecting: SOA, IBA, SOA and IBA or NPAC.

User Id: An optional field that passes a user Id used mostly for logging.

List Id: This is an integer that identifies the list from which a key was chosen to create the signature.

Key Id: This is an integer that identifies which key from the 1000 keys in a list was used to generate a signature.

CMIP Departure Time: This is the time at which a message was sent.

Sequence Number: This is 32 bit unsigned integer that starts at 0 and is incremented until wrapping at the maximum value.

Signature: The signature field contains the MD5 hashed and encrypted System Id, the System Type, the Lser Id, the CMIP Departure Time, and Sequence Number without separators between those fields or other additional characters. Encryption is done using RSA encryption using the key from the key list specified. Validation of this field ensures data integrity and non-repudiation of data.

Association Functions: These are set of flags that are set when an association is established.

Recovery Mode: The recovery mode flag is used to recover after downtime.

The NPAC/SMS 30 then relays the port data in a predefined message format to the IBA Subsystem 50 through interfaces 84. Like the SOA Subsystem 48, the IBA Subsystem 50 comprises a plurality of Regional IBA Subsystems 76 that update a single IBAR Subsystem 86. As shown in FIG. 3, the IBAR Subsystem 86 is accessible by a plurality of downstream applications, such as business applications 88, and network provisioning and configuration systems 90. It should be understood, however, that any type of downstream system can be connected to the IBAR Subsystem 86 at the option of the service provider. In this way the porting data is distributed to existing network applications, such as long distance and local business, for proper call routing and processing. Similarly, FIG. 4 depicts the IBAR Subsystem 86 sending LNP data to four specific Request Processing Applications (88 and 90 FIG. 3): an ANI Reference Information System ("ARIS") 96. Metro Intelligent Network Administration Service Management System ("MINA SMS") 98, Network Control System ("NCS") 100 and Provisions Voice Network ("RTE7") 102.

Moreover, FIG. 4 depicts several additional communication interfaces between the major subsystems of the LNP System 92: database access interface 104 between the Regional SOA 72 and RIBA 76 Subsystems; database access interface 106 between the RIBA 76 and SOA Engine 80 Subsystems; and database access interface 108 between the SOA Engine 80 and IBAR 86 Subsystem.

FIG. 4 also shows a National Network Management Center ("NNMC") 110. The NNMC 110 is a stand-alone subsystem designed for basic querying of database information on the SOA 72 and IBAR 86 Subsystems. Accordingly the NNMC 110 is connected through communication interfaces to the various databases in the LNP System 92: the SOA Engine Subsystem 80 through database access interface 114; the SOA Subsystem 72 through database access interface 116; and the IBAR Subsystem 86 through database access interface 118. An end-user can initiate a query using a NNMC GUI 112, which is connected to the NNMC 110. By entering a single telephone number and the database to query (either the SOA 126 (FIG. 5) or IBAR 172 (FIG. 7) Databases), an end-user can obtain such information as the LRN, effective date, service provider, action, status and telephone number range.

While FIGS. 3 and 4 depict the use of three (3) Regional SOA Subsystems 72, three (3) Regional NPAC/SMSs 74, and three (3) Regional IBA Subsystems 76, it is envisioned that each region providing local number portability, regardless of number, will have a corresponding SOA Subsystem 72. NPAC/SMS 74 and Regional IBA Subsystem 76. Moreover, while FIGS. 2, 3 and 4 illustrate various embodiments for achieving local number portability, it should be understood that other architectures may be similarly conceived and reduced to practice upon reference to this disclosure. It is anticipated therefore, that such other embodiments are well within the scope and spirit of the present invention. For example. FIGS. 5 through 8 disclose a detailed architectural design, in the form of block diagrams, for various subsystems that may be used to achieve local number portability in a preferred embodiment of the present invention.

Figure 5:
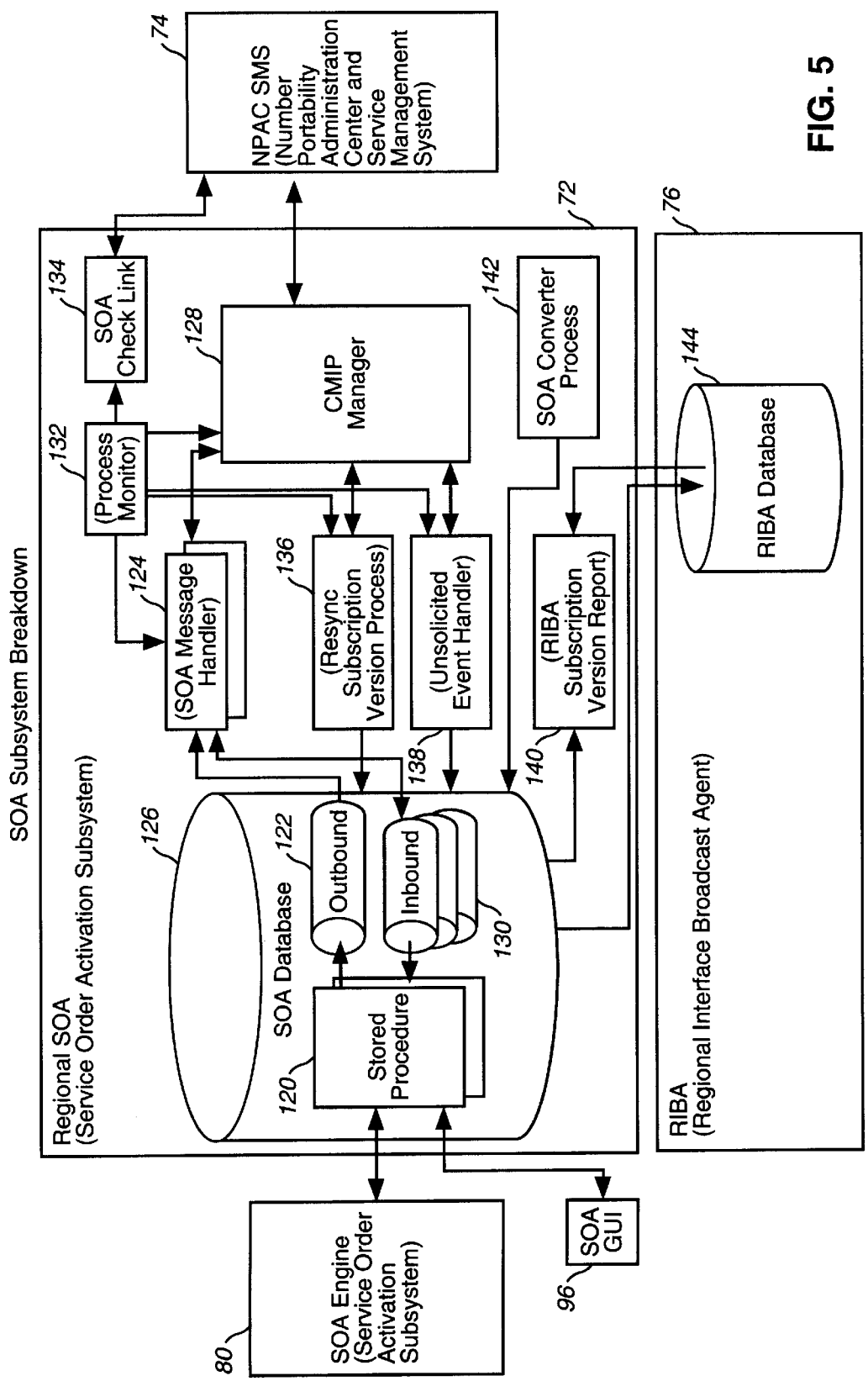
FIG. 5 is a block diagram of a novel SOA broken down into its component subsystems according to one embodiment.

Turning now to FIG. 5, the SOA Subsystem 72 is shown broken down into its functional components. LNP transactions, also referred to as messages or requests, originating either from the SOA Engine Subsystem 80 or an SOA GUI 94 are received through stored procedures 120, such as those used in an Oracle database structure. The stored procedures 120 send the message through a single outbound link 122 to a SOA Message Handler 124. Note that throughput can be increased by running multiple instances of the SOA Message Handler 124, each instance receiving messages from the single outbound link 122.

The SOA Message Handler 124 organizes and processes the messages by tasks that are preferably broken down at an object level, e.g., Subscription Version, Audit, Service Provider and Network. Based on a message identifier, the SOA Message Handler 124 queries the SOA Database 126 to collect and assemble any additional information required by the NPSAC, SMS 74. The SOA Message Handler 124 then sends the message to the CMIP Manager 128, which is a distributed systems generator that implements the interface between the SOA Subsystem 72 and the NPAC/SMS 74, and waits for a response from the CMIP Manager 128, such as success, failure or timeout. The CMIIP Manager 128 then logs and sends the message to the NPAC/SMS 74.

When the CMIP Manager 128 receives a response from the NPAC/SMS 74, the response is routed to the SOA Message Handler 124, which processes any information received with the response and updates the SOA Database 126 when required. The SOA Message Handler 124 then sends the response through an inbound link 130 to the stored procedures 120 and out to the originating SOA Engine Subsystem 80 or SOA GUI 94. All output to the stored procedures 120 is done through separate inbound links 130, one for each SOA GUI 94.

The SOA Database 126 is used to store and maintain the current telephone number information for a customer. Table 1 below is a domain field listing for an SOA Database 126 according to one embodiment:

TABLE 1

Domain List for one Embodiment of the SOA Database 126.

| Name | Code | Label | Type |
|---|---|---|---|
| BillingIdentifier | BILLING_ID | Billing Identifier | VARCHAR2(4) |
| BooleanIndicator | BOOL_IND | Boolean Indicator | NUMBERt(1) |
| City | CITY | | VARCHAR2(20) |
| CLASS DPC | CLASS_DPC | | VARCHAR2(9) |
| CLASS SSN | CLASS_SSN | | NUMBER(3) |
| CNAM DPC | CNAM_DPC | | VARCHAR2(9) |
| CNAM SSN | CNAM SSN | | NUMBER(3) |
| ContactType | CONTACT_TYP | Contact Type | VARCHAR2(2) |
| Country | COUNTRY | | VARCHAR2(20) |
| EndUserLocationType | END_USER_LOC_TYPE | | VARCHAR2(2) |
| EndUserLocationValue | END_USER_LOC_VALUE | | VARCHAR2(12) |
| Identifier | ID | | NUMBER(10) |
| Identifier | ID2 | | NUMBER(10) |
| ISVM DPC | ISVM_DPC | | VARCHAR2(9) |
| ISVM SSN | ISVM_SSN | | NUMBER(3) |
| LIDB DPC | LIDB_DPC | | VARCHAR2(9) |
| LIDB SSN | LIDB SSN | | NUMBER(3) |
| LNPtype | LNP_TYPE | | NUMBER(1) |
| LRN | LRN | | VARCHAR2(10) |
| NPA NXX | NPA_NXX | NPA-NXX | VARCHAR2(6) |
| NPA NXX | NPA_NXX2 | NPA-NXX | VARCHAR2(6) |
| OperationActton | OPER_ACT | Operation Action | NUMBER(3) |
| Postal Code | PC | Postal Code | VARCHAR2(40) |
| ServProvID | SP_ID | | VARCHAR2(4) |
| ServProvID | SP_ID2 | | VARCHAR2(4) |
| StateProvince | STATE_PROV | State Province | VARCHAR2(2) |
| Status | STATUS | Status Flag | NUMBER(10) |
| SystemType | SYSTEM_TYPE | | NUMBER(1) |
| TelephoneNumber | TN | Telephone Number | VARCHAR2(10) |
| Timestamp | T2 | DATE | |
| Timestamp | T | DATE | |
| TunableName | TUNABLE_NAME | Tunable Name | VARCHAR2(40) |
| TunableValue | TUNABLE_VALUE | Tunable Value | VARCHAR2(40) |
| UserIdentifier | USER_ID | | VARCHAR3(30) |
| Zip | ZIP | | VARCHAR2(9) |

TABLE 1

Domain List for one Embodiment of the SOA Database 126

A Process Monitor creates separate instances, SOA Process Monitor 132 and RIBA Process Monitor 167, which are the parent processes for the SOA 72 and RIBA 76 Subsystems and watch over all of the standard applications or processes required to run the Subsystems 72, 76. The SOA Process Monitor 132 and RIBA Process Monitor 167 keep a table of all applications or processes spawned and operational information about each application, such as the exit status of each application. The SOA Process Monitor 132 does not, however, monitor the IBA Subscription Version Report 140 or the SOA Converter Process 142. The SOA Process Monitor 132 starts applications when they are required and is notified if an application terminates. If an application, which is intended to always be running terminates, such as the CMIP Manager 128 and Check Link 134, the The SOA Process Monitor 132 will automatically restart the terminated application, A Research Subscription Version Process 136 is coupled to the SOA Database 126 and it is used to synchronize the SOA Subsystem 72 after a period of downtime. The Resynch Subscription Version Process 136 is started after the CMIP Manager 128 binds to the NPAC/SMS 74. In operation, the Resynch Subscription Version Process 136 requests from the NPAC/SMS 74, by way of the CMIP Manager 128, all subscription versions that have a modification time-stamp more recent than the last time the CMIP Manager 128 had an association with the NPAC/SMS 74. The Resynch Subscription Version Process 136 also sets a downtime flag in an audit database table to indicate that an audit was ongoing during a period of downtime.

The CMIP Manager 128 also receives notifications from the NPAC/SMS 74. These notification transactions are sent to an Unsolicited Event Handler 138 which, in turn, processes the transactions and updates the SOA Database 126 when necessarn. The Unsolicited Events Handler 138 waits for a message to be sent from the CMIP Manager 128. When the Unsolicited Events Handler 138 receives a message from the CMIP Manager 128, the Unsolicited Events Handler 138 determines the type of message and performs the required actions for that message type. When the action is complete, the Unsolicited Events Handler 138 formats and sends a reply to the CMIP Manager 128, which translates the message into a CMIP event and sends the event to NPAC/SMS 74.

The IBA Subscription Version Report 140, which is monitored and controlled by the operator, is used to report discrepancies between the SOA Database 126 and the RIBA Database 144, which is located in the Regional Interface Broadcast Agent ("RIBA") Subsystem 76. The Check Link 134 monitors the physical connection between the SOA Subsystem 72 and NPAC SMS 74 so that if the physical connection is broken, the Check Link 134 will reset the SOA Subsystem 72.

The SOA Converter Process 142 is a stand-alone process for NPA-NXX Split processing that performs a conversion of the telephone number value in the SOA Subscription Version table. Using tunable database links, the SOA Converter Process 142 accesses the NPA Split table in the IBAR Database 172 (FIG. 7) to determine the NPA-NXXs that are splitting, and their Permissive Dialing Periods ("PDPs"). At the start of a PDP, for a given NPA-NXX, the SOA Converter Process 142 performs a telephone number conversion. Each Subscription Version is retrieved from the SOA Database 126 to determine if the telephone number contains the old NPA-NXX. If so, the telephone number is modified to the new NPA-NXX. Other processes within the SOA Subsystem 72 continue processing during the conversion.

Figure 6:
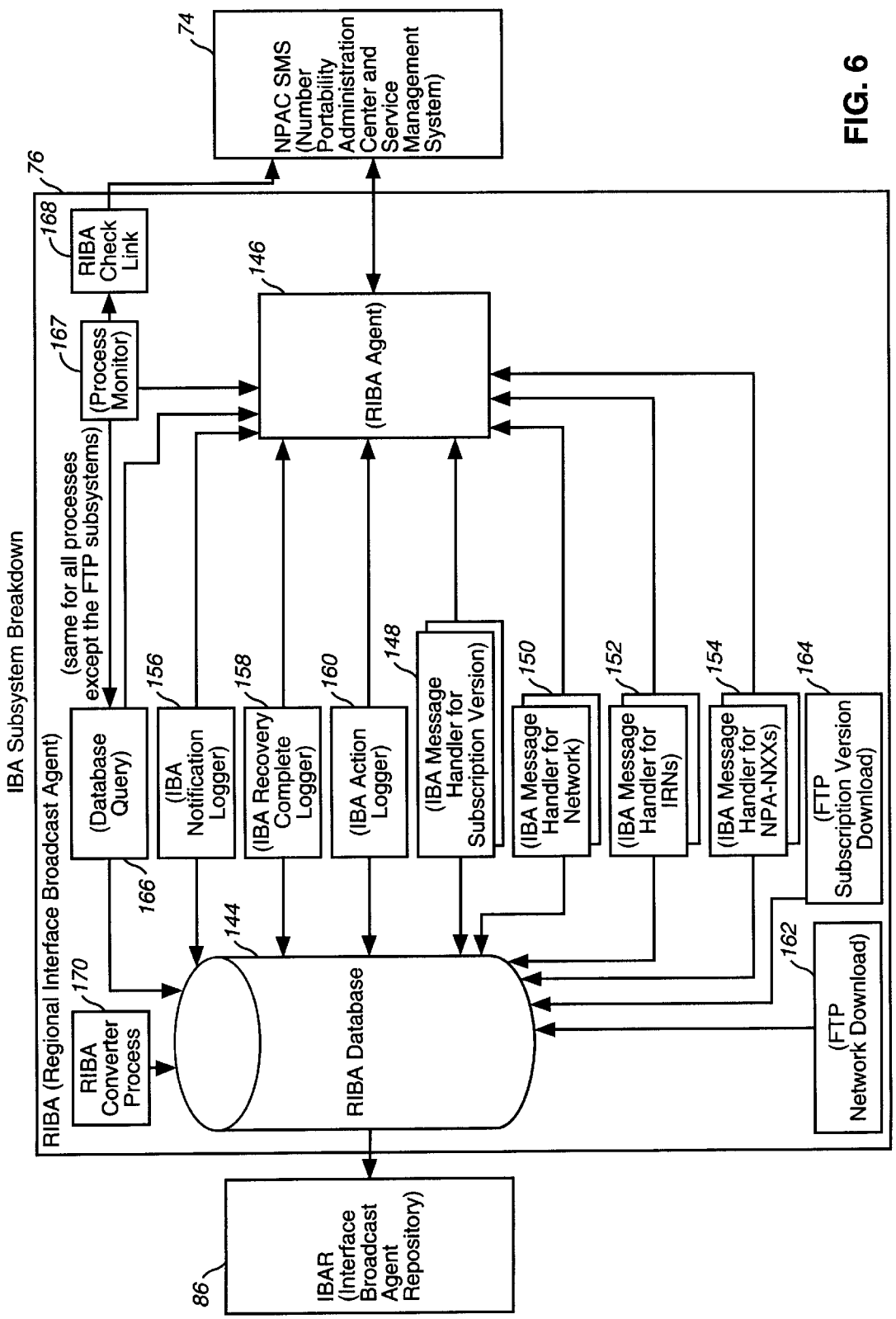
FIG. 6 is a block diagram of the novel IBA broken down into its component subsystems according to one embodiment.

Turning to FIG. 6, the Regional Interface Broadcast Agent ("RIBA") Subsystem 76 is broken down into its functional components. In general, the RIBA Subsystem 76 provides the interface between the NPAC/SMS 74 and the Interface Broadcast Agent Repository ("IBAR") Subsystem 86. When the NPAC/SMS 74 sends a message to the RIBA Subsystem 76, it is received by the RIBA Agent 146, which validates and strips the message of protocol related information. The RIBA Agent 146 then determines where the message is addressed to and sends the data to the appropriate application.

Messages from the NPAC/SMS 74 that request operations to be performed on tables within the RIBA Database 144, such as SET, CREATE and DELETE, are sent to RIBA Message Handlers. FIG. 6 illustrates the use of four (4) RIBA Message Handlers, each handling CMIP messages for a specific object type and performing updating operations on tables within the RIBA Database 144: a Subscription Version Message Handler 148; a Network Message Handler 150; a LRN Message Handler 152; and a NPA-NXX Message Handler 154. When the appropriate RIBA Message Handler, either 148, 150, 152 or 154, accepts the message, the data is then extracted from the message and the operation is determined. An SQL statement is built for the action using the data values extracted from the message. The SQL statement is then performed, which updates the RIBA Database 144.

The FTP Network Download 162 and FTP Subscription Version Download 164 applications can update or restore the RIBA Database 144 and IBAR Database 172 from the NPAC/SMS 74 via FTP/TCPIP. These FTP application 162 and 164, which are controlled by an operator, read the subscription version and service provider network information from the NPAC/SMS 74 via FTP TCPIP to form a flat the and update the appropriate database tables with the new information. These activities should be appropriately logged.

Upon startup, the RIBA Agent 146 uses the Database Query process 166 to read each data item (subscription version, service provider network, LIN, and NPA-NXX information) from the RIBA Database 144 and loads them into memory. These data items form the Managed Instance Tree ("MIT"), which is used be the RIBA Subsstem 76 as reference points to the stored data during its operation. Once the load has been completed, the RIBA Agent 146 binds to the NPAC/SMS 74 and sends a download and recovery complete transaction to desynchronize the RIBA Subsystem 76. When the bind has been successfully established, the RIBA Agent 146 requests that the NPACISMS 74 download all of the subscription, NPA-NXX and LRN data which was accumulated during the time that the RIBA Agent 146 was not bound to the NPAC/SMS 74. Upon successful completion of the download, the RIBA Agent 146 informs the NPAC SMS 74 that the download has been completed and normal processing resumes.

The RIBA Agent 146 also receives notification, recovery complete and action transactions, which are forwarded to the appropriate logging utilities: a Notification Logger 156; a Recovery Complete Logger 158; and an Action Logger 160. These logging utilities, 156, 158 and 160, perform actions that are common to the RIBA log and notification programs. These procedures are contained in a separate program file and linked with the log and notification programs. When changes are required in the utility functions, these changes only need to be made in one place and the programs reconipijed. These utilities process and handle the transactions and update the RIBA Database 144.

In use, the NPAC SMS 74 sends variable length create requests to the RIBA Agent 146 consisting of subscription data and a list of one or more telephone numbers for each subscription data element. The RIBA Agent 146 extracts the create request from the CMIP message and formats it into a structure suitable for use by the Action Logger 160 which, in turn, extracts the subscription version data from the structure. The Action Logger 160, which communicates directly with the RIBA Agent 146, is started by the Process Monitor 167 at the request of the RIBA Agent 146.

The Notification Logger 156 is used to log notifications received by the RIBA Agent 146. In this way, the NPAC-SMS Operational Information and Version New NPA-NXX notifications are logged. The RIB. Agent 146 receives these notifications from the NPAC/SMS 74, formats the information into a usable structure and forwards the structure to the Notification Logger 156 over a UNIX socket. The Notification Logger 156 is started by the Process Monitor 167 at the request of the RIBA Agent 146.

The Recovery Complete Logger 158 is used to log Recovery Complete Replies and Download Replies sent by the NPAC/SMS 74 to the RIBA Agent 146. The RIBA Agent 146 receives these actions from the NPAC/SMS 74, formats the information into a usable structure and forwards the structure to the Recovery Complete Logger 156 over a UNIX socket. The Recovery Complete Logger 156 is started by the Process Monitor 132 at the request of the RIBA Agent 146.

Table 2 is a domain field listing for an the IBA Database 144 according to one embodiment:

TABLE 2

Domain field list for IBA Database.

| Name | Code | Label | Type |
|---|---|---|---|
| BillingIdentifier | BILLING_ID | Billing Identifier | VARCHAR2(4) |
| booleanIndicator | BOOL_IND | Boolean Indicator | NUMBER(1) |
| city | CITY | VARCHAR2(20) | |
| CLASS DPC | CLASS_DPC | VARCHAR2(9) | |
| CLASS SSN | CLASS_SSN | NUMBER(3) | |

TABLE 2-continued

Domain field list for IBA Database.

| Name | Code | Label | Type |
|---|---|---|---|
| CNAM DPC | CNAM_DPC | VARCHAR2(9) | |
| CNAM SSN | CNAM_SSN | NUMBER(3) | |
| contact Type | CONTACT_TYPE | Contact Type | VARCHAR2(2) |
| country | COUNTRY | VARCHAR2(20) | |
| endUserLocationType | END_USER_LOC_TYPE | VARCHAR2(2) | |
| endUserLocationValue | END_USER_LOC_VALUE | VARCHAR2(12) | |
| Identifier | ID | NUMBER(10) | |
| ISVM DPC | ISVM_DPC | VARCHAR2(9) | |
| ISVM SSN | ISVM_SSN | NUMBER(3) | |
| LIDB DPC | LIDB_DPC | VARCHAR2(9) | |
| LIDB SSN | LIDB_SSN | NUMBER(3) | |
| LNPtype | LNP_TYPE | NUMBER(1) | |
| LRN | LRN | VARCHAR2(10) | |
| NPA NXX | NPA NXX | NPA-NXX | VARCHAR2(6) |
| operationAction | OPER_ACT | NUMBER(3) | |
| organizationId | ORGNZ_ID | ID number of an organization, client, NPAC, regional IBA. | VARCHAR(3) |
| Postal Code | PC | Postal Code | VARCHAR2(40) |
| serProvID | SP_ID | VARCHAR2(4) | |
| stateProvince | STATE_PROV | State/Province | VARCHAR2(2) |
| status | STATUS | Status Flag | NUMBER(10) |
| systemType | SYSTEM_TYPE | NI | |
| telephoneNumber | TN | Telephone Number | VARCHAR2(10) |
| timestamp | T | DATE | |
| tunableName | TUNABLE_NAME | Tunable Name | VARCHAR2(40) |
| tunableValue | TUNABLE_VALUE | Tunable Value | VARCHAR2(40) |
| userIdentifier | USER_ID | VARCHAR2(30) | |
| zip | ZIP | VARCHAR2(40) | |

TABLE 2

Domain field list for IBA Database

The RIBA Process Ntonitor 167, wxhich was previously described in reference to the SOA Subsystem 72 (FIG. 5), watches over all of the standard applications or processes required to run the RIBA Subsystem 76. The RIBA Process Monitor 167 does not, however, monitor the FTP processes 162 and 164, or the RIBA Converter Process 170. The RIBA Process Monitor 167 starts applications when they are required and is notified if an application terminates. If an application, which is intended to always be running terminates, such as the RIBA Agent 146 and RIBA Check Link 168, the RIBA Process Monitor 167 will automatically restart the terminated application. The RIBA Check Link application 168 monitors the physical connection between the RIBA Subsystem 76 and NPAC/SMS 74. If the physical connection is broken, the RIBA Check Link 168 will reset the RIBA Subsystem 76.

The RIBA Converter Process 170 is a stand-alone process for NPA-NXX Split processing that performs a conversioni of the telephone number value in the RIBA Subscription Version table. Using tunable database links, the RIBA Converter Process 170 accesses the NPA Split table in the IBAR Database 172 (FIG. 7) to determine the NPA-NXXs that are splitting, and their Permissive Dialing Periods ("PDPs"). At the start of a PDP, for a given NPA-NXX, the RIBA Converter Process 170 performs a telephone number conversion. Each telephone number record is retrieved from the RIBA Database 144 to determine if the telephone number contains the old NPA-NXX. If so, the telephone number is modified to the new NPA-NXX. Other processes within the RIBA Subsystem 76 are suspended for the duration of the conversion process.

Figure 7:
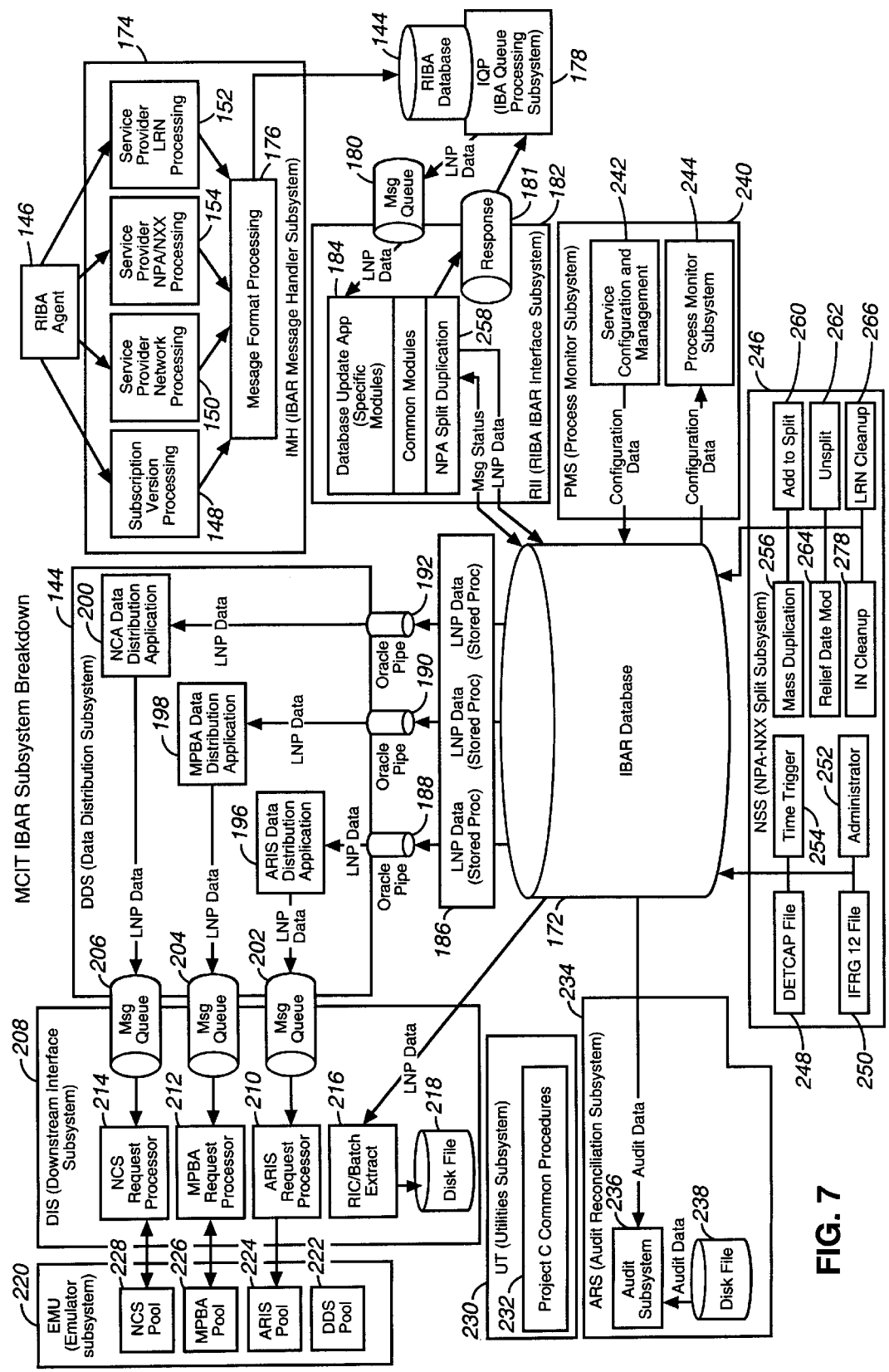
FIG. 7 is a block diagram of the novel IBAR broken down into its component subsystems according to one embodiment.

Turning to FIG. 7, the Interface Broadcast Agent Repository ("IBAR") Subsystem is shown and denoted generally as 86. A particularly advantageous aspect of the present invention is that it provides interfaces from the IBAR Subsystem 86 to internal systems operated by the individual service providers. FIG. 7 illustrates four (4) proprietarv downstream systems have been coupled to the IBAR Subsystem 86 for receiving data. The NCS 100 and RTE7 102 systems manage local number portability information in the long distance environment while the MINA/SMS 98 is configured to manage local number portability information on the local service network level. Also, the MUS 96 collects local number portability ("LNP") information for distribution to service provider business systems 68 (FIG. 2) and 88 (FIG. 3).

As such, and according to one embodiment of the invention, the IBAR Subsystem 86 supports the following features:

A facility to consolidate LNP data from the RIBA Database 144 into the IBAR Database 172.

A data distribution application that manages distribution of data to the ARIS 96, MINA/SMS 98, and NCS 100 systems. This application will track the status of transactions to each of these systems.

An on-line interface to the NCS long distance support system 100 preferably using the DECmessageQ product from Digital Equipment Corp.

An on-line interface to the MINA/SMS system 98 preferably using Service Builder System Management Interface product from Northern Telecom.

An on-line interface to the ARIS system 96 preferably using the Registry Messagin product from MCI.

A batch interface to the RTE7 long distance support system 102 usino FTP.

NPA-NXX Split Processing.

The IBAR Message Handler Subsystem 174 comprises the message handlers in the RIBA Subsystem 76 (FIG. 6). As previously described, the RIBA Agent 146 receives messages containing data from the NPAC/SMS 74 (FIG. 6). These messages are then directed to the proper message handlers: Subscription Version Message Handler 148. Network Message Handler 150, LRN Message Handler 152, and NPA-NXX Message Handler 154. These message handlers process the messages and data in block 176 (not explicitly shown in FIG. 6) and stores the data in the RIBA Database 144. The IBAR Message Handler Subsystem 174 also inserts the data into a feeder table which will be read by the IBA Queue Processing Subsystem 178.

The IBA Queue Processing Subsystem 178, which is responsible for sending all changes received by the RIBA Database 144 to the RIBA/IBAR Interface Subsystem 182, reads the data from the feeder table and tags each message with a tracking number before it is put into the Message Queue 180. As will be described below, the tracking number ensures that the messages are delivered in sequential order.

The RIBA/IBAR Interface Subsystem 182 is responsible for keeping the IBAR Database 172 up to date with the changes that are made in the RIBA Database 144. The RIBA/IBAR Interface Subsystem 182 includes a database update application 184 that reads and processes the messages from the Message Queue 180. During processing, the underlying message data is acquired and organized by tasks, which are broken down at the "object" level (i.e. Telephone Number, Audit, Sevice Provider, and Network). The database update application 184 then Sedates the appropriate database fields in the IBAR Database 172 with the "object" data and calls stored procedures 186 to populate dedicated links 188, 190 and 192 with the information stored in the IBAR Database 172.

To ensure that duplicate messages are not processed, the RIBA/IBAR Interface Subsystem 182 verifies that each message read from the Message Queue 180 is the next consecutively numbered message. The RIBA/IBAR Interface Subsystem 182 also provides the ability to track messages from any RIBA Subsystem 76 by recording all tracking numbers associated with each RIBA Subsystem 76 and its associated record in the IBAR Database 172.

At the end of a successful transaction, the RIBA/IBAR Interface Subsystem 182 sends a response to the Response Queue 181 for each message received from Message Queue 180 as to whether it was successfully applied, rejected due to validation errors, or needs to be resent to the Message Queue 180. The IBA Queue Processing Subsystem 178 reads the responses from the Response Queue 181, processes them, and makes the appropriate updates to the table. For example, if the tracking number is out of sequence, the RIBA/IBAR Interface Subsystem 182 issues a "resend" of the specific message and any messages that have been put into the Message Queue 180 after the specific message. If, however, the specific message cannot be found in the table, the IBA Queue Processing Subsystem 178 sends a "lost" message notification and the resend process continues.

Multiple instances of the RIBA/IBAR Interface Subsystem 182 can be run to accommodate various types of NPAC/SMS 74. This allows each NPAC/SMS 74 to have different information that is to be sent to the RIBA Subsystem 76 and then to the IBAR Subsystem 86. As a result, a version ID is used to identify the type of NPAC/SMS 74 reviewing a given region so that all information can be sent to one Message Queue 180.

As mentioned above, stored procedures 186 extract data from the IBAR database 172 and write the data to the appropriate dedicated links 188, 190 and 192. Each downstream on-line Data Distribution Application has its own dedicated link (e.g. link 188 for ARIS 96 messages, link 190 for MINA/SMS 98 messages and link 192 for NCS 100 messages). Data from each dedicated link is then read by the appropriate dedicated Data Distribution Application (e.g., application 196 for AS 96 messages, application 198 for MINA/SMS 98 messages, and application 200 for NCS 100 messages).

These dedicated Data Distribution Applications, which are part of the Data Distribution Subsystem 194, then send the transactions to a second set of Message Queues, each dedicated Data Distribution Application having its own dedicated Message Queue (e.g., Message Queue 202 for ARIS 96 messages, Message Queue 204 for MINA/SMS 98 messages, and Message Queue 206 for NCS 100 messages). The Message Queues 202, 204 and 208 then send the transactions to the Downstream Interface Subsystem 208, which contains an interface for each application format (e.g., ARIS Request Processing Interface 210 for MUS 96 messages, MINA/SMS Request Processing Interface 212 for MINA/SMS 98 messages, and NCS Request Processing Interface 214 for NCS 100 messages).

Once the message has been sent to the appropriate interface in the Downstream Interface Subsystem 208, the status of the record in the IBAR Database 172 will be changed to "Sending." In addition, the Message Queues 202, 204 and 206 are continuously monitored as transactions are added to them so that any errors can be detected and an alarm can be triggered, for example, in the format of error messages to be returned by processes handling the additions of the transactions to the Message Queues 202, 204 and 206. In the event of a message failure, or a process or system failure, or during system startup, a recovery process is started and the status of the records in the IBAR Database 172 are checked. During this recovery process, all records in the IBAR Database 172 having a status of "Sending" will be resent to the Downstream Interface Subsystem 208 in the same manner as previously described. Regular processing of messages from the IBAR Database 172 to the Downstream Interface Subsystem 208 will be held up until the recovery process is complete.

In the Downstream Interface Subsystem 208, a custom request processing application for each on-line interface to a network provider's external system will read the requests from a message and facilitate the transfer over the specific interface. They will format the data as required by the interface (e.g., Northern Telecom's Service Management Interface protocol requirements) and ensure that the data is delivered across the interface. Typically, the data is sent in a synchronous manner to the network provider's external system via an ASCII based TCP/IP socket interface. The network provider's external system is responsible for queuing the data to a serial communication port. The responses received from the network provider's external system can be sent in an asynchronous manner. Although the Downstream Interface Subsystem 208 as illustrated in FIG. 7 supports four proprietary interfaces, it should be understood that any interface can be supported depending on the external system used by the service provider.

The Downstream Interface Subsystem 208 uses various mechanisms that allow the IBAR Subsystem 86 to communicate with external systems. For example, the MINA/SMS Request Processing Interface 212 is implemented as a stream of data sent via a TCP/IP socket interface using SMI protocol. The NCS Request Processing Interface 214 is implemented using the ported telephone number and request Service Provider NPA-NXX data and is set up as a two-way dialog, i.e. data is sent to the NCS 100 and the NCS 100 replies after processing the data. The MUS Request Processing Interface 210 is implemented using the ported telephone number data and uses MCI Registry or a similar communications protocol, which is a one-way dialog. That is, data is sent to ARIS 96, but ARIS 96 does not return confirmation after processing the data. Unlike the other Request Processing Interfaces 210, 212 and 214, the RTE7 Batch Extract 216 consists of a regularly scheduled batch job that extracts the required transactions directly from the IBAR Database 172 and writes them to a disk file 218. The resulting disk file 218 is transmitted to RTE7 102 via TCP, IP using FTP.

Using the above described Request Processing Interfaces 210, 212 and 214, a user is able to access a menu from which the user can: connect or disconnect from the NCS Message Queue; logon or logoff the MINA/SMS session; or register or deregister from the ARIS registry. In response to the user's selection, the Service Configuration and Management Application 242 sends a signal to one of three Request Processing Interfaces 210, 212 or 214. For example, in the UNIX operating environment, two signals are used: SIGUSR1 and SIGUSR2. The SIGUSR1 signal is used for "connect", "logon" and "register" commands; whereas the SIGUSR2 signal is used for "disconnect", "logoff" and "deregister" commands.

An Emulator Subsystem 220 is communicably linked to the Downstream Interface Subsystem 208 and is used for testing and validation, the Downstream Interface Subsystem 208. Communication between the Downstream Interface Subsystem 208 and Emulator Subsystem 220 is accomplished using different protocols for each individual program, such as: a DEC Message Queue for the DDS Emulator 222 and the NCS Emulator 228; a UNIX TCP/IP socket library for the MINA/SMS Emulator 226; and Registry for the ARIS Emulator 224.

The Utilities Subsystem 230 contains a set of utility functions and common procedures 232 that are used to speed up the development of UNIX and SQL programs. These functions have been developed specifically for use in the IBAR Subsystem 86 application environment and provide solutions to common problem requirements such as Oracle stored procedures 184, Message Queue access, FTP access, error handling, process signal control and any other software functions that may be best implemented as a utility.

An Audit Reconciliation Subsystem 234 provides service providers interfacing with the IBAR Subsystem 86 the ability to audit their databases against the IBAR Database 172. Some service providers may consider the IBAR Database 172 to be the database of record for LNP data. The Audit Reconciliation Subsystem 234 supports both regularly scheduled and on demand audit requests. The Audit Reconciliation Subsystem 234 will support requests for subsets of the data in the IBAR database 172 as well as complete database dumps. A system administrator can schedule these requests and will manually clean out any audit files that are no longer required. Specifically, the Audit Subsystem 236 extracts the audit data from the IBAR Database 172 and writes it to a disk file 238 that can be distributed using FTP.

The Process Monitor Subsystem 240 provides the means to start and stop the IBAR applications and includes the Service Configuration and Management Application 242, which was previously described, and a Process Manaeer 244. The Service Configuration and Nianagement Application 242 provides the means to stop and restart communications between each of the real time on-line interfaces found in the Distribution Interface Subsystem 208 and its downstream server counterpart operated by the service provider. The Process Manager 244 provides the means to stop and restart the RIBA/IBAR Interface Subsystem 182, the Data Distribution Subsystem 194 and the Downstream Interface Subsystem 208. Accordingly, the Process Monitor Subsystem 244 is started at system start-up and spawns the initial IBAR applications. The Process Monitor 244 also monitors each application process and will re-start any process that terminates abnormally. In other embodiments, the Process Monitor 244 can spawn more copies of the same systems upon request. The initial information is stored in a file and loaded by the Process Monitor 244 when it is started.

The NPA-NXX Split Subsystem 246 is responsible for processing NPA splits and includes several processes: NETCAP File Access Process 248; LERG 12 File Access Process 250; Administrator Process 252; Time Trigger Process 254; Mass Duplication Process 256; Add-to-Split Process 260; Unsplit Process 262; Relief Date Modification Process 264; LRN Cleanup Process 266; and Telephone Number Cleanup Process 268. These processes are described below.

The NETCAP File Access Process 248 determines when an NPA is going to split what the new NPA-NXX is going to be, and at what date the split will occur. The NETCAP File Access Process 248 reads the NETCAP file and updates the NPA Split table in the IBAR Database 172 as appropriate. The NPA Split table in the IBR Database 172 is where the status of each split is tracked and is used to provide the key input for driving NA Split processing. The NETCP file is the primary external data source of SNPA Split information and is in a mainframe dataset format that must first be retrieved via FTP or some other mainframe-to-Unix utility. Although the NETCAP File Access Process 248 is preferably a regularly scheduled daily batch job, it can also be started manually by the system operator.

More specifically, the NETCAP File Access Process 248 first determines whether the NPA-NXX in the NETCAP file is portable by looking for the NPA-NXX in the IBAR Database 172. If the NPA-NXX does not exist in the IBAR Database 172, the NPA-NXX is bypassed. If on the other hand, the NPA-NXX does exist, the NPA-NXX is deemed to be portable and the RIBA Subsystem 76 associated the NPA-NXX is determined using the Action ID in the IBAR Database 172.

The NETCAP File Access Process 248 then determines the type of record to insert, modify or delete in the NPA Split table for the portable NPA-NXX. Existing NPA Split records having a status of "Completed" are deleted. A NPA Split record having an action of "Unsplit" may also be deleted prior to the Duplication Trigger Point. If the Relief Date for a NPA split record changes before the Mass Duplication Process 256 has been run, then only the NPA Split record's Relief Date is modified and the Relief Date Modification Process is not required.

The LERG12 File Access Process 250 reads the LERG 12 file and updates the LERG 12 table in the IBAR Database 172 as appropriate. The LERG 12 file is a mainframe dataset that is downloaded as a flat file for processing and is used as a secondary external data source of NTA Split information as it pertains to LRNs. The NPA-NXXs defined in the NETCAP data serve to identify both telephone numbers and LRNs affected by a split, as it is understood that LRNs contain valid NPA-NXXs. The LERG 12 data is used for confirmation that the LRNs identified as split-affected by the NETCAP data are valid split-affected LRNs according to the LERG. The LERG 12 File Access Process 250 is preferably a regularly scheduled monthly batch job.

The LERG12 File Access Process 250 checks for the existence of a LERG 12 flat-file. If one exists, the LERG 12 table, which is used for exception reporting, is purged so that the LERG 12 flat-file data can be re-inserted in the IBAR Database 172. This effectively replaces the old data in the LERG 12 table with the new data from the LERG 12 flat-file. The LERG 12 File Access Process 250 also has the ability to designate the LERG 12 flat-file via a command-line specified filename (optional), instead of using the default provided within the program.

The Administrator Process 252 produces exception reports based on information retrieved from the IBAR Database 172, the NETCAP file and the LERG 12 file. This process is executed on demand by a systems administrator or operator.

The Time Trigger Process 254 reads the NPA Split table in the IBAR Database 172 and processes each active record according to the Action and Status attributes and other tunable parameters, such as the Duplication Trigger Point. The Duplication Trigger Point is a tunable period of time prior to the start of Permissive Dialing Period. The Time Trigger Process 254 updates the NPA Split table as appropriate and starts the following processes: the Mass Duplication Process 256, the Add-to-Split Process 260, the Unsplit Process 262, the Relief Date Modification Process 264, the LRN Cleanup Process 266 and the Telephone Number Cleanup Process 268.

The Time Trigger Process 254 is also responsible for setting a suspend tag in the IBAR Database 172 that, as will be described below, suspends the RIBAR IBAR transaction flow prior to the running of the Mass Duplication Process 256. The Add-to-Split Process 260 and the Unsplit Process 262. This ensures that all existing IBAR transactions will be processed without interruption of the incoming flow and that none of the new incoming transactions will be inadvertently bypassed during split processing. Once the Mass Duplication Process 256, Add-to-Split Process 260 and Unsplit Process 262 are complete, the Time Trigger Process 254 resets the suspend flag.

The Time Trigger Process 254 runs continuously under the control of the Process Monitor 244. At a tunable period of time and after each pass through the NPA Split table, the Time Trigger Process 254 sleeps for a short time. There will be one instance of the Time Trigger Process 254 for each RIBA Subsystem 76 to facilitate processing of the NPA Split table. Each RIBA Subsystem 76 will process only the NPA-NXXs particular to the region serviced by the RIBA Subsystem 76 and the Regional NPAC/SMS 74. Each NPA Split record is processed in a synchronous mode such that, for each NPA Split record read, a process may or may not be executed depending on its conditions, and the process will be completed before the next NPA Split record is retrieved.

The Mass Duplication Process 256 reads the IBAR Database 172 and determines which records need to be duplicated for NPA Splits. Each current record that contains the affected NPA-NXX and an action of "Activate" or "Modify" is duplicated. The duplicated records are written to the IBAR Database 172 and then sent to MINA/SMS 98 by batch file and to the NCS 100 via Oracle pipes. The duplicated records are not sent to ARIS 96. The Mass Duplication Process 256 is started by the Time Trigger Process 254 when the Duplication Trigger Point is reached for a vixen NPA-NXX.

The NPA Split Duplication Process 258 within the RIBA IBAR Interface Subsystem 182 is responsible for notifying the IBA Queue Processing Subsystem 178 to suspend the RIBA to IBAR transaction flow, and for duplicating incoming transactions at the appropriate time. For NPA Split processing, the SNPA Split Duplication Process 258 regularly examines the suspend flag in the IBAR Database 172 that is set by the Time Trigger Process 254. When the suspend flag is set, the NPA Split Duplication Process 258 notifies the IBA Queue Processing Subsystem 178 via the Response Queue 181 which then stops sending messages from the RIBA Database 144 to the Message Queue 180. The IBA Queue Processing Subsystem 178 periodically sends a message to the RIBA/IBAR Interface Subsystem 182 prompting the NPA Split Duplication Process 258 to check on the status of the suspend flag. Once the suspend flag has been reset by the Time Trigger Process 254, the NPA Split Duplication Process 258 notifies the IBA Queue Processing Subsystem 178 via the Response Queue 181 to resume sending messages.

For duplicating incoming transactions, the NPA Split Duplication Process 258 first completes regular processing of each transaction, including committing the record to the IBAR Database 172. The NPA Split Duplication Process 258 then compares each transaction against the NPA Split table in the IBAR Database 172 to determine whether the transaction is to be duplicated or not. A transaction is duplicated if the telephone number contains an affected NPTA-NXX, the action is "Activate." "Modify" or "Disconnect" and the current processing time is between the Duplication Trigger Point and the Mandators Dialing Date. Duplicated transactions are assigned an Action ID indicating that it is a duplicate and not an original transaction.

Transactions that are duplicated during the period from the Duplication Trigger Point to the Relief Date are sent only to MINASMS 98 and NCS 100 via existing mechanisms. Transactions that are duplicated during the period from the Relief Date to the Mandatory Dialing Date are sent to ARIS 96, MINA/SMS 98 and NCS 100 via existing mechanisms.

The Add-to-Split Process 260 performs the same role as the Mass Duplication Process 256 in reading the IBAR Database 172 and determining which records need to be duplicated for NPA Splits. This process, however, can be triggered by the Time Trigger Process 254 at any time that the Time Trigger Process 254 retrieves an SPA Split record indicating that an NPA-NXX requires Add-to-Split processing. An Add-to-Split can occur before and during the Permissive Dialing Period, with the same, or with different, start and end Permissive Dialing Period dates.

The records duplicated by the Add-to-Split Process 260 are written to the IBAR Database 172 and then sent to MINA SMS 98 via the regular mechanism and not by batch file, as in the case of the Mass Duplication Process 256. These duplicated records are also sent to NCS 100, but are not sent to ARIS 96.

The Unsplit Process 262 reads the IBAR Database 172 and determines which telephone numbers require a "Duplicated Disconnect" transaction due to a NPA-NXX Unsplit. A "Duplicate Disconnect" transaction is created for each telephone number that contains an NPA-NXX that has been unsplit, and any action other than "Disconnect" or "Duplicate-Disconnect." The "Duplicate Disconnect" transactions are sent to NCS 100 via the regular method, but are rot sent to the ARIS 96 or the MINA SMS 98. ARIS 96 performs Unsplit processing of its own and MINA/SMS 98 is informed of "Disconnect" telephone numbers via E-mail.

The Unsplit Process 262 can be triggered by the Time Trigger Process 254 at any time between the Duplication Trigger Point and the Mandatory Dialing Date, if the Mass Duplication Process 256 has been run. The Time Trigger Process 254 ensures that the RIBA/IBAR incoming transaction feed is suspended prior to the running of the Unsplit Process 262.

The Relief Date Modification Process 264 reads the IBAR Database 172 and determines which records need to be updated with a new Relief Date. Each record that contains an affected NPA-NX is updated with the new Relief Date. These modifications are not sent to ARIS 96, MINA/SMS 98 or NCS 100. The Relief Date Modification Process 264 is triggered by the Time Trigger Process 254 at any time prior to Permissive Dialing Period if the Mass Duplication Process 256 has been run.

The LRN Cleanup Process 266 reads the IBAR Database 172 and determines which records require a modification to the LRN attribute. A "Modify" transaction is created for each record that contains an LRN with an old NPA-NXX, a telephone number not containing an old NPA-NXX, and any action other than "Disconnect" or "Duplicate Disconnect." The "Modify" transactions are sent to ARIS 96, MINA/SMS 98 and NCS 100 using the regular methods. The LRSN Cleanup Process 266 is triggered by the Time Trigger Process 254 to run at the LRN Clean-up Trigger Point, which is a tunable number of hours prior to the Mandatory Dialing Date.

The Telephone Number Cleanup Process 268 reads the IBAR Database 172 and determines which records require a "Disconnect" transaction. A "Disconnect" transaction is created for each record that contains an old NPA-NXX and any action other than "Disconnect" or "Duplicate-Disconnect." The "Disconnect" transactions are sent to NCS 100 using the regular methods, but are not sent to ARIS 96 or MINA/SMS 98. The MINA/SMS 98 is informed of "Disconnect" telephone numbers via E-mail. The Telephone Number Cleanup Process 268 is triggered by the Time Trigger Process 254 at the telephone number Clean-up Trigger Point which is a tunable number of hours after the Mandatory Dialing Date.

Briefly referring back to FIGS. 3 and 4 the SOA Engine Subsystem 80 uses a message-based protocol to provide an interface between the Local Customer Order Entry Order Processing ("OE/OP") Systems (collectively referred to as the "Front End" 78 and the SOA 32 and RIBA 34 Subsystems. Thus, the SOA Engine Subsystem 80 allows the Front End 78 to upload data, audit, query and otherwise communicate with the NPAC/SMS 74.

Figure 8:
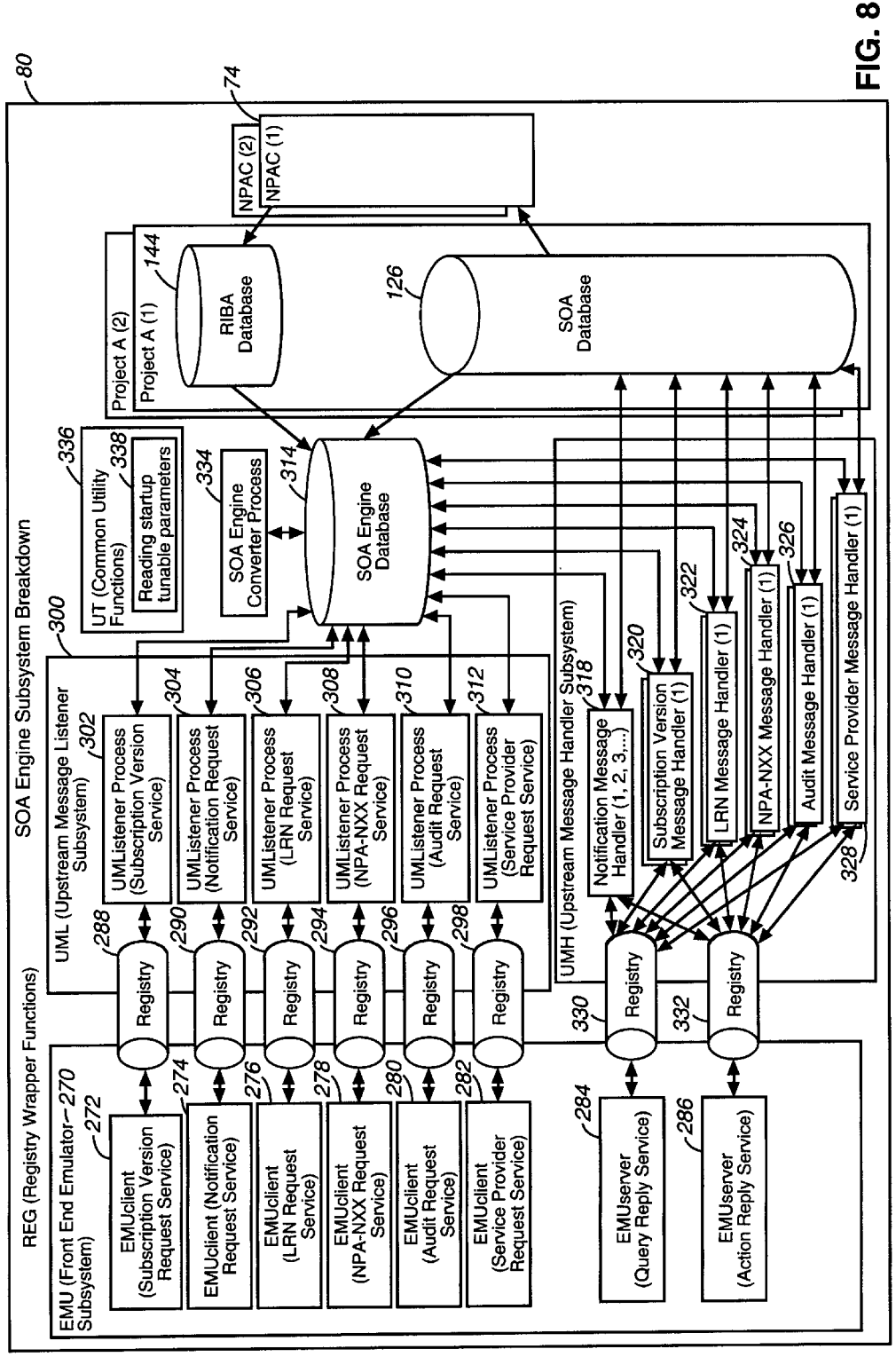
FIG. 8 is a block diagram of the novel SOA Engine broken down into its component subsystems according to one embodiment.

Now referring to FIG. 8, the SOA Engine Subsystem 80 will be described in detail. The Front End Emulator Subsystem 270 includes both client and sener applications, which provide the interface between the SOA Engine Subsystem 80 and the Front End 78. The client applications handle requests from the Front End 78, whereas the server applications handle reply or responses to the Front End 78. More specifically and as illustrated in FIG. 8, the client applications may include a Subscription Version Request Service 272, a Notification Request Service 274, a LRN Request Service 276, a NPA-NXX Request Service 278, an Audit Request Service 280 and a Service Provider Request Service 282. The server applications may include a Query Reply Service 284 and an Action Reply Service 286.

Each client application 272, 274, 276, 278, 280 and 282 sends request messages from the Front End 78 to an Upstream Message Listener Subsystem 300 using the appropriate Registry protocols 288, 290, 292, 294, 296 and 298. Once a client application 272, 274, 276, 278, 280 or 282 sends a request message, that client application will wait for a reply message before sending another request message.

For each request message, the Upstream Message Listener Subsystem 300 determines the particular NPAC/SMS 74 to which the request message is to be delivered to and writes the request message to the SOA Engine Database 314 using a Subscription Version Request Listener 302, a Notification Request Listener 304, a LRN Request Listener 306, a NPA-NXX Request Listener 308, an Audit Request Listener 310 and a Service Provider Request Listener 312. The appropriate Listener 302, 304, 306, 308. 310 or 312 also sends a reply message back to Front End 78 through the appropriate client application 272, 274, 276, 278, 280 or 282. The reply message indicates only that the request message has been received and queued for transmission to the appropriate NPAC/SMS 74, and does not indicate that the request message has been sent to or processed by the NPAC/SMS 74.

The SOA Engine Database 314 contains a queuing table for each type of request message. The Upstream Message Handler Subsystem 316 polls these queuing tables using a Notification Message Handler 318, a Subscription Version Message Handler 320, a LRN Message Handler 322, a NPA-NXX Message Handler 324, an Audit Message Handler 326 and a Service Provider Message Handler 328 to retrieve the appropriate records and processes them accordingly. These Message Handlers will now be described in more detail.

The Notification Message Handler 318 polls the Notification table in the SOA Engine Database 314 to retrieve all records and determines the action to be performed on each retrieved record based on the record message type and status. If the record is a new request, the information needed to create the response message will be fetched from the SOA Database 126 or the corresponding database table will be updated. As was previously described in regard to FIG. 5, the new request message is processed by the SOA Subsystem 72, sent to and processed by the NPAC/SMS 74 and a response message is created and returned containing the result of the new request message. If the record is not a new request, an error response message will be created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Notification Message Handler 318. If the confirmation message is received, the Notification Message Handler 318 deletes the record from the Notification table in the SOA Engine Database 314. Otherwise, the result status of Notification table will be updated for the request. The Notification Message Handler 318 keeps running until all the records in the Notification table are processed. If there are no more records in the Notification table, the Notification Message Handler 318 sleeps for a certain time before it wakes up and begins to poll the Notification table again.

The Subscription Version Message Handler 320 polls the Subscription Version queuing table in the SOA Engine Database 314 to retrieve all records based on a telephone number range. The Subscription Version Message Handler 320 analyzes each retrieved record and determines the action to be performed based on the record message type and status. If the record is a new message the Subscription Version message Handler 320 calls the appropriate stored procedure 120 (FIG. 5) in the SOA Database 126. As was previously described in regard to FIG. 5, the new request message is processed by the SOA Subsystem 72, sent to and processed by the NPAC, SMS 74 and a response message is created and returned containing the result of the new request message. Once a response is received from the stored procedure 120 (FIG. 5), it is evaluated and the return code is used to update the record status in the Subscription Version queuing table and a response message is created containing the message data and header. If the record is not a new message, a "resend" message will be reissued containing only the error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Notification Message Handler 318. If the confirmation message is received, the Notification Message Handler 318 deletes the record from the Subscription Version queuing table in the SOA Engine Database 314.

The LRN Message Handler 322 polls the LRN queuing table in the SOA Engine Database 314 to retrieve all LRN Message records. The LRN Message Handler 322 analyzes each retrieved record and determines the action to be performed based on the record message type, status and received date. If the record is a new message, the LRN Message Handler 322 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and a response message will be created. If the record is not a new message, the date of the record is examined. If it is expired, it will be deleted from LRN queuing table. Otherwise, an error response message will be created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the LRN Message Handler 322. If the LRN Message Handler 322 receives the confirmation message, the LRN Message Handler 322 deletes the record from the LRN Message queuing table in the SOA Engine Database 314. Otherwise, the result status of the LRN Message queuing table will be updated for the request.

The NPA-NXX Message Handler 324 polls the NPA-NXX queuing table in the SOA Engine Database 314 to retrieve all NPA-NXX Message records. The NPA-NXX Message Handler 324 analyzes each record retrieved and determines the action to be performed based on the message type, status, and received date. If the record is a new message, the NPA-NXX Message Handler 324 calls the appropriate stored procedure (FIG. 5) in the SOA Database 126. As Was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and a response message created. If the record is not a new message, the date of the record is examined and if it is expired, it will be deleted from NPA-NXX queuing table. Otherwise, an error response message is created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the NPA-NXX Message Handler 324. If the NPA-NXX Message Handler 324 receives the confirmation message, the NPA-NXX Message Handler 324 deletes the record from the NPA-NXX queuing table in the SOA Engine Database 314. Otherwise, the result status of the NPA-NXX queuing table will be updated for the request.

The Audit Message Handler 326 polls the Audit queuing table in the SOA Engine Database 314 to retrieve all request records for processing. The Audit Message Handler 326 analyzes each record retrieved and determines the action to be performed based on the message type and status. If the record is a new message, the Audit Message Handler 326 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the queuing table and a response message is created containing the header and the message data. If the record is not a new message, the response message is created containing an error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Audit Message Handler 326. The Audit Message Handler 326 waits until the confirmation message is received in order to delete the record from the message queuing table in the SOA Engine Database 314.

The Service Provider Message Handler 328 polls the Service Provider queuing table in the SOA Engine Database 314 to retrieve all request records. The Service Provider Message Handler 328 analyzes each record retrieved and determines the action to be performed based on the message type and status. If the record is a new message, the Service Provider Message Handler 328 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the queuing table and a response message is created containing the header and the message data. If the record is not a new message, the response message is created containing an error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Service Provider Message Handler 328. The Service Provider Message Handler 328 waits until the confirmation message is received in order to delete the record from the message queuing table in the SOA Engine Database 314.

The SOA Engine Converter Process 334 is a stand-alone process that is started up as is needed. It accesses the NPA Split table in the IBAR Database 172, using tunable Oracle database links to determine the NPA-NXXs that are splitting and their Permissive Dialing Periods. At the start of a Permissive Dialing Period for a given NPA-NXX, the SOA Engine Converter Process 334 performs a telephone number conversion. Each telephone number record is retrieved from the SOA Engine Database 314 to determine if the telephone number contains the old NPA-NXX. If so, the telephone number is modified to the new NPA-NXX. Other processes within the SOA Engine Subsystem 80 continue processing during the conversion.

A Common Utility Function Subsystem 336 provides a set of utility functions that are available to speed development of UNIX and SQL programs. These utility functions, which include reading startup tunable parameters 338, are developed specifically for use in the SOA Engine Subsystem 80 application environment to provide solutions to common programming requirements, such as Oracle stored procedures.

Figure 9:
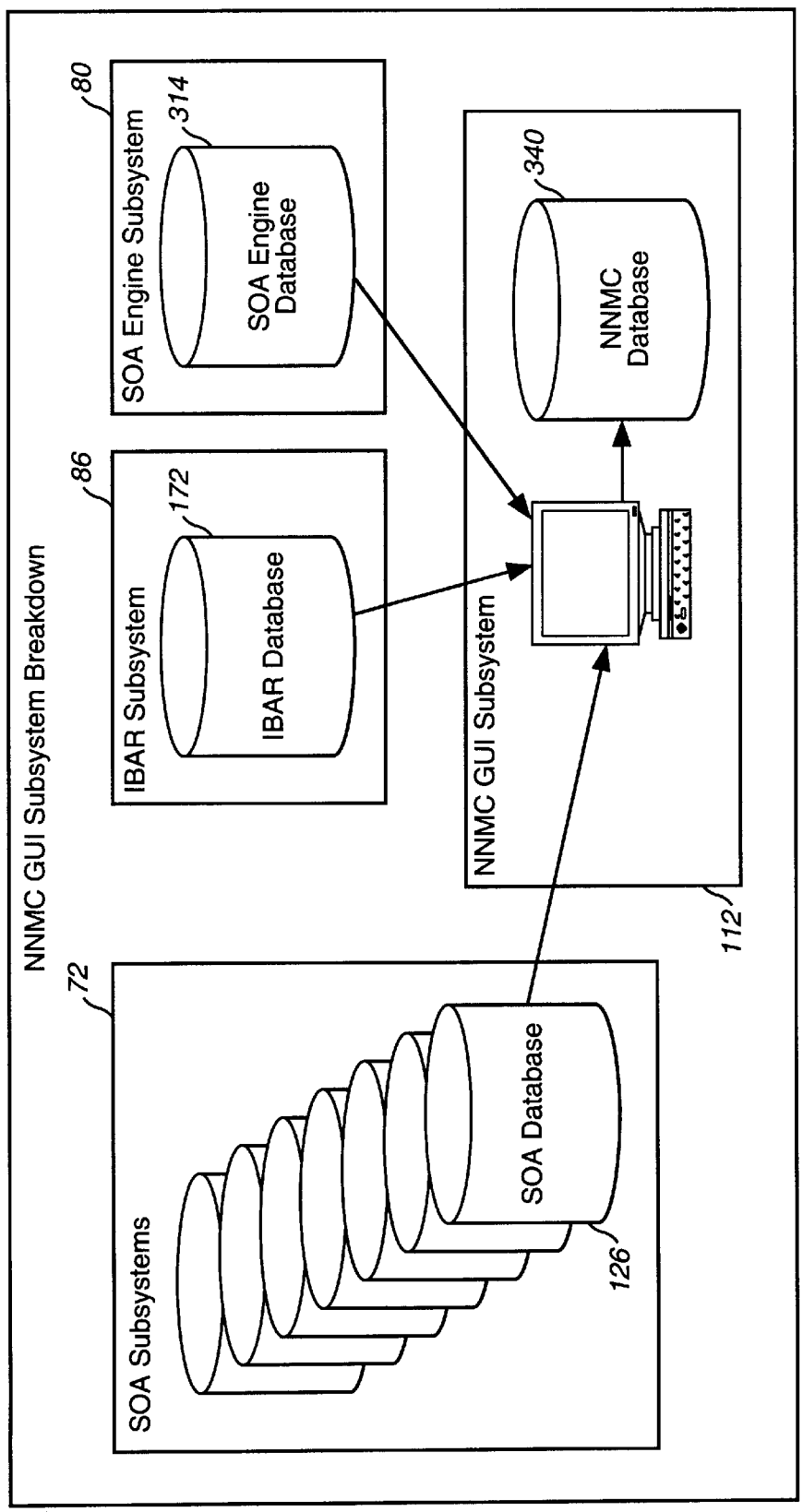
FIG. 9 is a block diagram of the novel NNMC GU Subsystem according to one embodiment.

Now referring to FIG. 9, the NNMC GUI Subsystem 112 will be described. The GUI Subsystem 112 connects to the SOA Databases 126 in the SOA Subsystems 72, the IBAR Database 172 in the IBAR Subsystem 86, the SOA Engine Database 314 in the SOA Engine Subsystem 80. Access to the SOA 126, IBAR 172 and SOA Engine 314 Databases is performed via database links, which are stored in the NNMC Database 340. A table within the NNMC Database 340 tracks the number of queries performed per day, per SOA Subsystem 72 and IBAR Subsystem 86. The number of queries is limited to a tunable daily maximum before the end-user is denied access. Based on the telephone number queried, the NNMC GUI 112 uses a telephone number to NPAC cross-reference table within the SOA Engine Database 314 to determine the correct SOA Database 126 to access.

Figure 10:
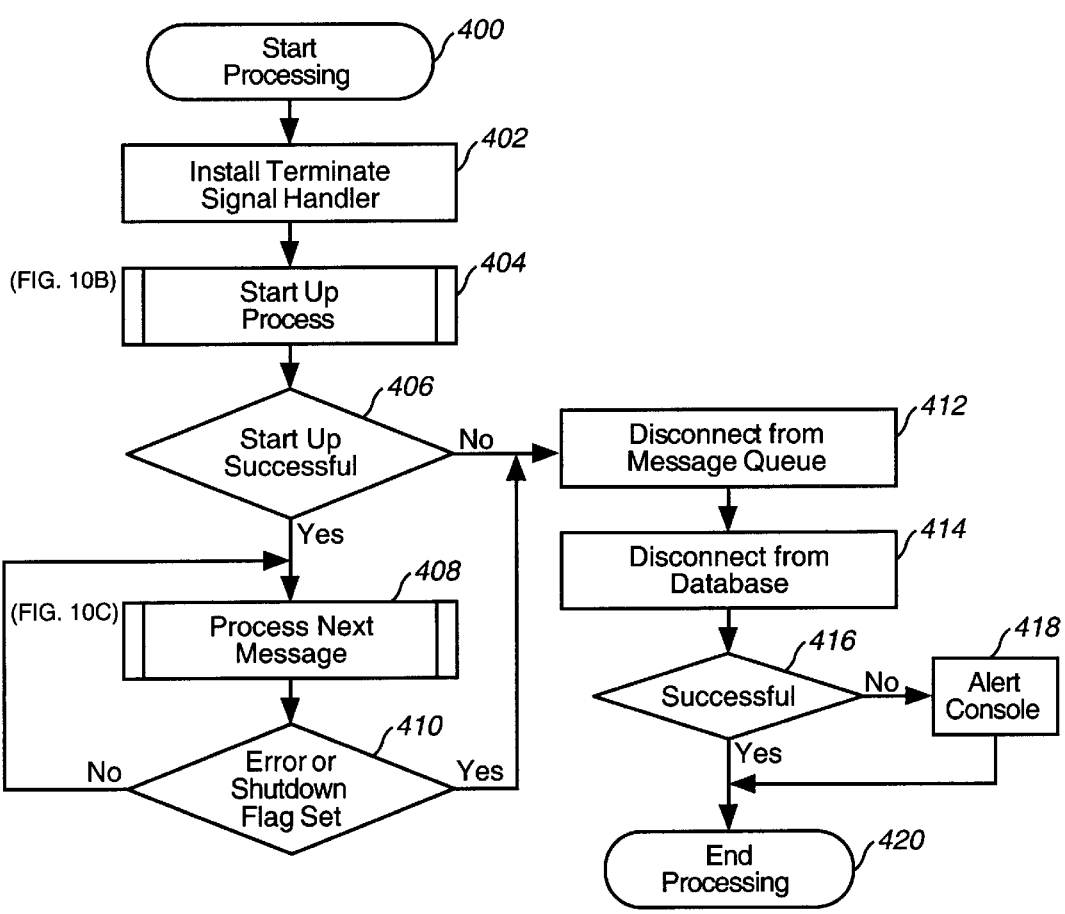
FIGS. 10, 10A, 10B, 10C, 10D, 10E, 10F, 10G, 10H, 10I, 10J and 10K are flow charts for various novel processes for interfacing messages between the IBAR and the RIBA according to one embodiment of the invention.

FIG. 10 is a flowchart for message processing that occurs when the IBAR receives a message from the RIBA. Messages from the RIBA have been placed in the RIBA Message Queue 180 as discussed previously with regard to FIG. 7. Information is updated in the IBAR Database 172 to coincide with the information updated in the RIBA databases 144 of FIG. 7. After starting processing in step 400, step 402 installs a Terminate Signal Handler which is described below with regard to step 422 of FIG. 10A. Step 404 is a Start Up Process which is described below with regard to step 432 of FIG. 10B. Step 406 determines Whether the Start Up Process was successful. If it is determined in step 406 that the Start Up Process was not successful, step 412 disconnects from the Message Queue. Step 414 then disconnects from the IBAR Database 172. Step 416 then determines whether the disconnect from the IBAR Database 172 of step 414 was successful. If it is determined in step 416 that the disconnect from the IBAR Database 172 was successful, then step 420 ends processing. If it is determined in step 416 that the disconnect from the IBAR Database 172 was not successful, step 418 alerts a Console, and control passes to step 420, as discussed above. If step 406 determines that the Start Up Process was successful, step 408 processes a Next Message as discussed below with regard to step 474 of FIG. 10C. Step 410 then determines if an Error or Shutdown Flag is set. If it is determined in step 410 that an Error or Shutdown Flag is not set, then control passes to step 408 as discussed above. If it is determined in step 410 that an Error or Shutdown Flag is set, then control passes to step 412, as discussed above.

Figure 10A:
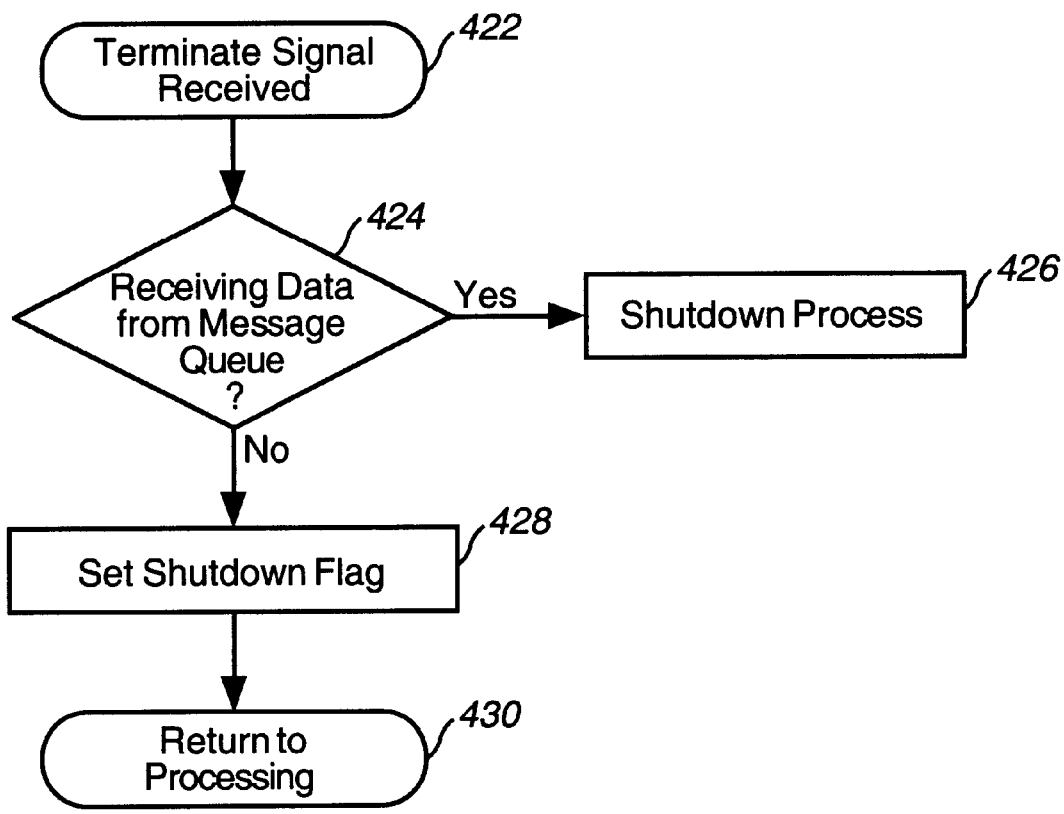

FIG. 10A is a flowchart for the Terminate Signal Handler which is installed as discussed above with regard to step 402 of FIG. 10. In step 422, a Terminate Signal is received. Step 424 then determines whether data is being received from a Message Queue. If step 424 determines that data is being received from the RIBA Message Queue 180, then step 426 executes a Shutdown Process. If it is determined in step 424 that data is not being received from the RIBA Message Queue 180, step 428 sets a Shutdown Flag, and step 430 returns to Processing.

Figure 10B:
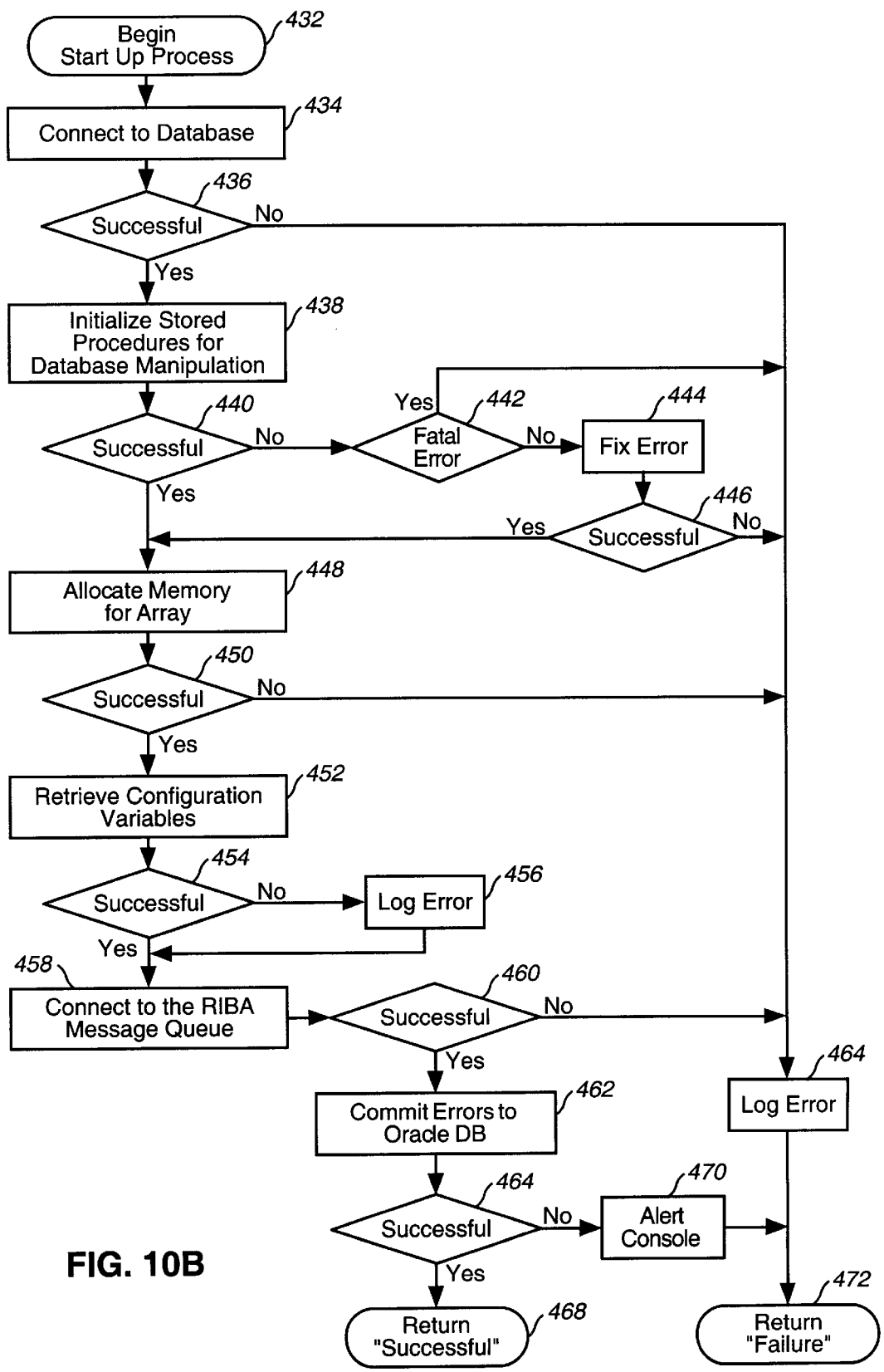

FIG. 10B is a flowchart for the Start Up Process which was discussed above with regard to step 404 of FIG. 10. After starting in step 432, step 434 connects to IBAR Database 172. This step ensures a clean start in processing of message data from the RIBA Message Queue 180 currently being processed. Step 436 determines whether the connection to the IBAR Database 172 Was successful. If it is determined in step 436 that the connection to the IBAR Database 172 was not successful, step 464 logs an Error, and step 472 returns a value of "Failure" to the calling step 404 of FIG. 10. If it determined in step 436 that the connection to the IBAR Database 172 was successful, step 438 initializes stored procedures for database manipulation. Step 440 then determines whether the initialization of step 438 was successful. If it is determined in step 440 that the initialization was successful, step 448 allocates memory for an array. Step 450 then determines whether the allocation in step 448 was successful. If it is determined in step 450 that the allocation was successful, then step 452 retrieves configuration variables which are the tunable information of the IBAR Database 172. Step 454 then determines whether the retrieval of step 452 was successful. If it is determined in step 454 that the retrieval was not successful, then step 456 logs an error. Step 458 then connects to the RIBA Message Queue 180 of FIG. 7. If it is determined in step 454 that the retrieval was successful, control passes to step 458, which was discussed above. Step 460 then determines whether the connection of step 458 was successful. If step 460 determines that the connection was successful, then step 462 commits errors to the IBAR Database 172. Step 466 then determines whether the errors were committed successfully. When step 466 determines that the errors were committed successfully, a value of "Successful" is returned to the calling step 404 of FIG. 10. If step 466 determines that the errors were not committed successfully, then step 470 alerts a Console. Control then passes to step 472 as discussed above.

When step 440 determines that the initialization of step 438 is not successful, step 442 then determines whether the failed initialization created a fatal error. When step 442 determines that the error is not tats step 444 fixes the error. Step 446 then determines whether the error was fixed successfully in step 444. When step 446 determines that the error was fixed successfully in step 444 then control passes to step 448, which was discussed above.

When step 442 determines that the error from the initialization was fatal, then step 464 logs the error. Step 472 then returns a value of "Failure" to the calling step 404 of FIG. 10.

When step 446 determines that the error was not successfully fixed in step 444, then control passes to step 464 as discussed above.

When step 450 determines that the allocation of step 448 was not successful, then control passes to step 464 as discussed above.

When step 460 determines that the connection of step 458 was not successful, control passes to step 464 as discussed above.

Figure 10C:
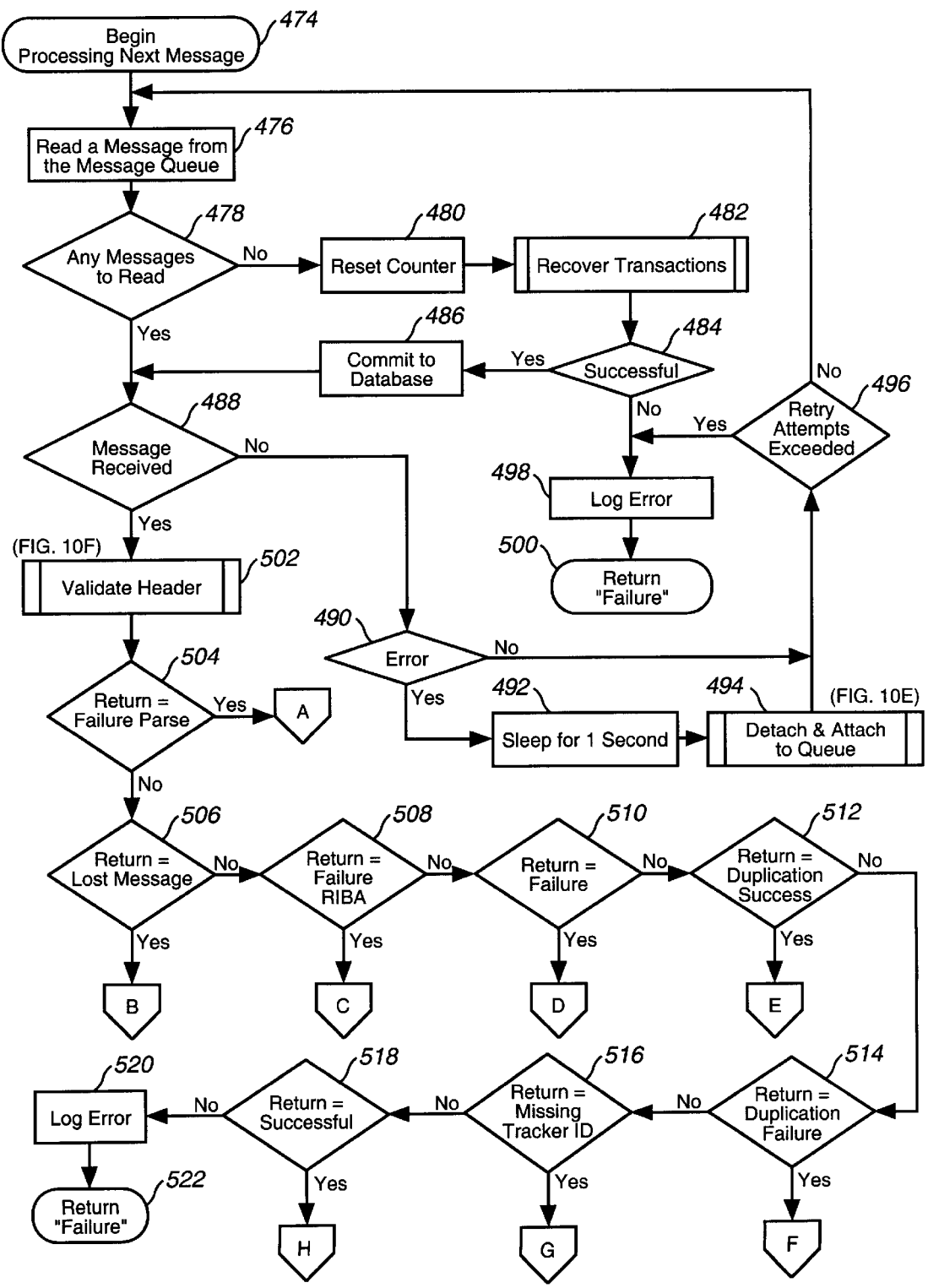

FIG. 10C is a flowchart for step 408 process Next Message of FIG. 10. After starting in step 474, step 476 attempts to read a Message from the RIBA Message Queue 180 of FIG. 7. Step 478 then determines whether there are an messages to read. If step 478 determines that there are messages to read, then step 488 determines whether a message is received. When step 488 determines that a message has been received, step 502 validates a Header, as discussed below with regard to FIG. 10F.

Step 504 then determines whether Return has a value of "Failure Parse". When step 504 determines that Return has a value of "Failure Parse", control passes to process A, which is discussed below with regard to FIG. 10D. When step 504 determines that Return does not have a value of "Failure Parse", step 506 determines whether Return has a value of "Lost message". When step 506 determines that Return has a value of "Lost Message", control passes to process B, which is discussed below with regard to FIG. 10D. When step 506 determines that Return does not have a value of "Lost Message", step 508 determines whether Return has a value of "Failure RIBA". When step 508 determines that Return has a value of "Failure RIBA", control passes to process C, which is discussed below with regard to FIG. 10D.

When step 508 determines that Return does not have a value of "Failure RIBA", step 510 determines whether Return has a value of "Failure". When step 510 determines that Return has a value of "Failure", control passes to process D, which is discussed below with regard to FIG. 10D. When step 510 determines that Return does not have a value of "Failure", step 512 determines whether Return has a value of "Duplication Success". When step 512 destinies that Return has a value of "Duplication Success", control passes to step E, which is discussed below with regard to FIG. 10D.

When step 512 determines that Return does not have a value of "Duplication Success", step 514 determines whether Return has a value of "Duplication Failure". When step 514 determines that Return has a value of "Duplication Failure", control passes to process F, which is discussed below with regard to FIG. 10D. When step 514 determines that Return does not have a value of "Duplication Failure", step 516 determines whether Return has a value of "Missing Tracker ID". When step 516 determines that Return has a value of "Missing Tracker ID", control passes to process G, which is discussed below with regard to FIG. 10D.

When step 516 determines that Return does not have a value of "Missing Tracker ID", step 518 determines whether Return has a value of "Successful". When step 518 determines that Return has a value of "Successful", control passes to step H, which is discussed below with regard to FIG. 10D. When step 518 determines that Return does not have a value of "Successful", step 520 logs an error, and step 522 returns a value of "Failure" to the calling step 408 of FIG. 10.

When step 478 determines that there are no messages to read, step 480 resets a counter. Step 482 recovers transactions, which are messages that were in process, or data, which were in the queue before the system was last turned off. Step 484 determines whether the recovery of step 482 was successful. If step 484 determines that the recovers was successful, step 486 commits to the IBAR Database 172, and control passes to step 488 which was discussed above. When step 484 determines that the recovery of step 482 was not successful, step 498 logs an error and step 500 returns a value of "Failure" to the calling, step 408 of FIG. 10.

When step 488 determines that a message was not received, step 490 determines whether there is an error in the message. When step 490 determines that there is an error in the message, step 492 sleeps for one second. Step 494 perform a process to detach and attach to the RIBA Message Queue 180 of FIG. 7 which is discussed below with regard to FIG. 10E. Step 496 determines whether a number of allowed retry attempts has been exceeded. When step 496 determines that the number of allowed retry attempts has been exceeded, control passes to step 498 as discussed above. When step 496 determines that the number of retry attempts has not been exceeded, control passes to step 476 as discussed above.

When step 490 determines that there is not an error in the message, control passes to step 496 as discussed above.

Figure 10D:
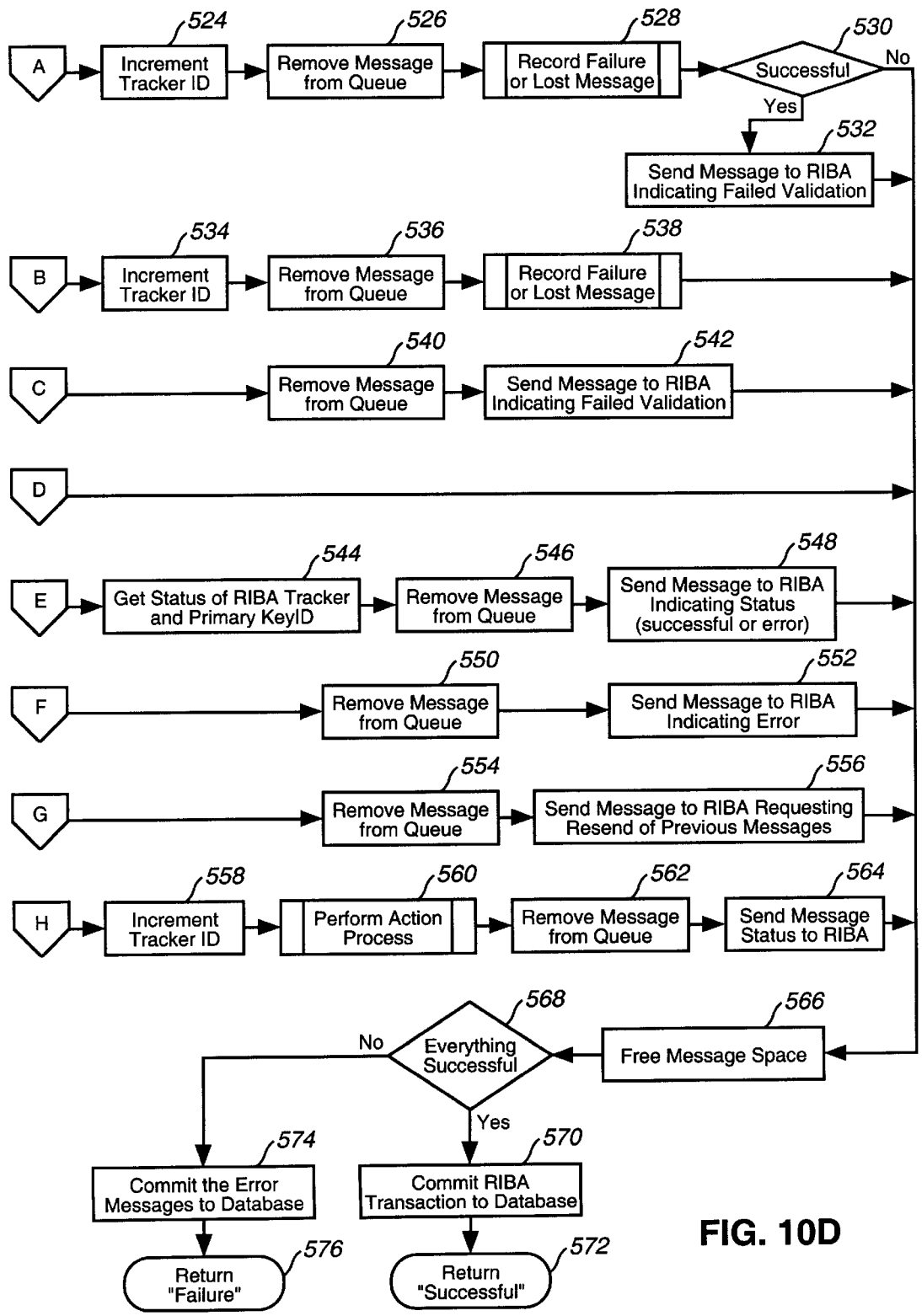

FIG. 10D is a flowchart showing the logic for the processes A–H referenced above with regard to FIG. 10. Regarding process A, step 524 increments the Tracker ID. Step 526 then removes a message from the RIBA Message Queue 180 of FIG. 7. Step 528 performs a process to record a failure or a lost message, as discussed below with regard to step 656 of FIG. 10G. Step 530 determines whether the recording was successful. If step 530 determines that the recording was successful, step 532 sends a message to the RIBA system indicating a failed validation.

Step 566 then frees the message space. Step 568 determines whether all determining steps of success have indicated successful. When step 568 determines that not every determining step has indicated successful, step 574 commits the error messages to the IBAR Database 172. Step 576 then returns a value of "Failure" to the appropriate calling step of FIG. 10C. When step 568 determines that all determining steps of success have indicated successful, step 570 commits a RIBA transaction to the IBAR Database 172. Step 572 then returns a value of "Successful" to the appropriate calling step of FIG. 10C.

When step 530 determines that the recording step 528 has not been successful, control passes to step 566 as discussed above.

Regarding process B, step 534 increments the Tracker ID. Step 536 then removes a message from the RIBA Message Queue 180. Step 538 calls a process to record a failure or a lost message, discussed below with regard to step 656 of FIG. 10G. Control then passes to step 566 as discussed above.

Regarding process C, step 540 removes a message from the RIBA Message Queue 180. Step 542 then sends a message to the RIBA system indicating a failed validation. Control then passes to step 566 as discussed above.

Regarding process D, control passes to step 566 as discussed above.

Regarding process E, step 544 obtains the status of the RIBA Tracker and Primary Key ID. Step 546 then removes a message from the RIBA Message Queue 180. Step 548 then sends a message to the RIBA system indicating a status, which is either successful or an error status. Control then passes to step 566 as discussed above.

Regarding process F, step 550 removes a message from the RIBA Message Queue 180. Step 552 then sends a message to the RIBA system indicating an error. Control then passes to step 566 as discussed above.

Regarding process G, step 554 removes a message from the RIBA Message Queue 180. Step 556 then sends a message to the RIBA system requesting a resend of previous messages. Control then passes to step 566 as discussed above.

Regarding process H, step 558 increments the Tracker ID. Step 560 performs an action process as discussed below with regard to step 678 of FIG. 10H. Step 562 then removes a message from the RIBA Message Queue 180. Step 564 then sends a message status to the RIBA system. Control then passes to step 566 as discussed above.

Figure 10E:
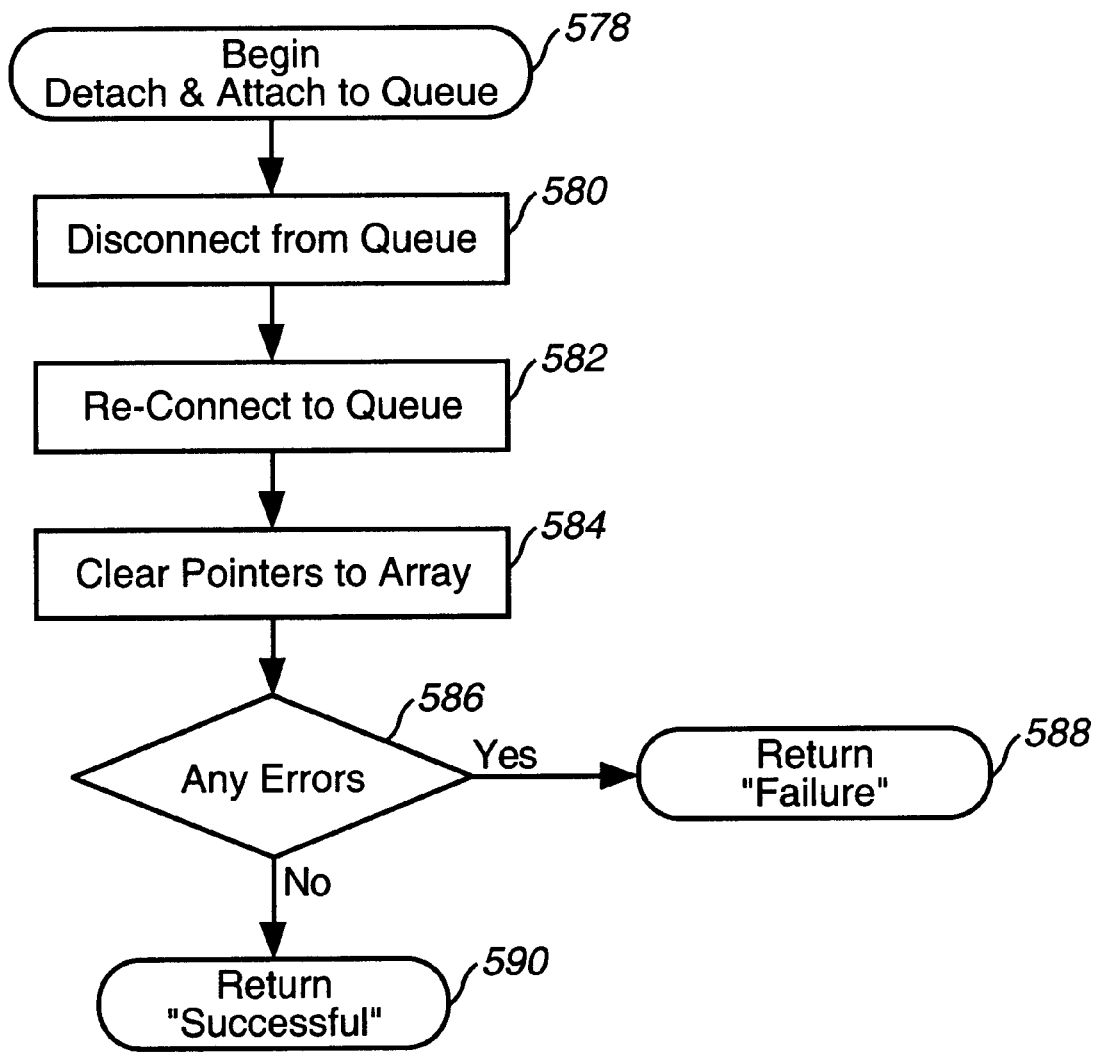

FIG. 10E is a flowchart for the process to detach and attach to the RIBA Message Queue 180 which is called by step 494, discussed above with regard to FIG. 10C. After starting in step 578, step 580 disconnects from the RIBA Message Queue 180. Step 582 then re-connects to the RIBA Message Queue 180. Step 584 clears pointers to the array. Step 586 determines whether any errors have been reported. If step 586 determines that there have been errors reported, step 588 returns a value of "Failure" to the calling step 494 of FIG. 10C. If step 586 of FIG. 10E determines that there have not been any errors reported, then step 590 returns a value of "Successful" to the calling step 494 as discussed previously with regard to FIG. C.

Figure 10F:
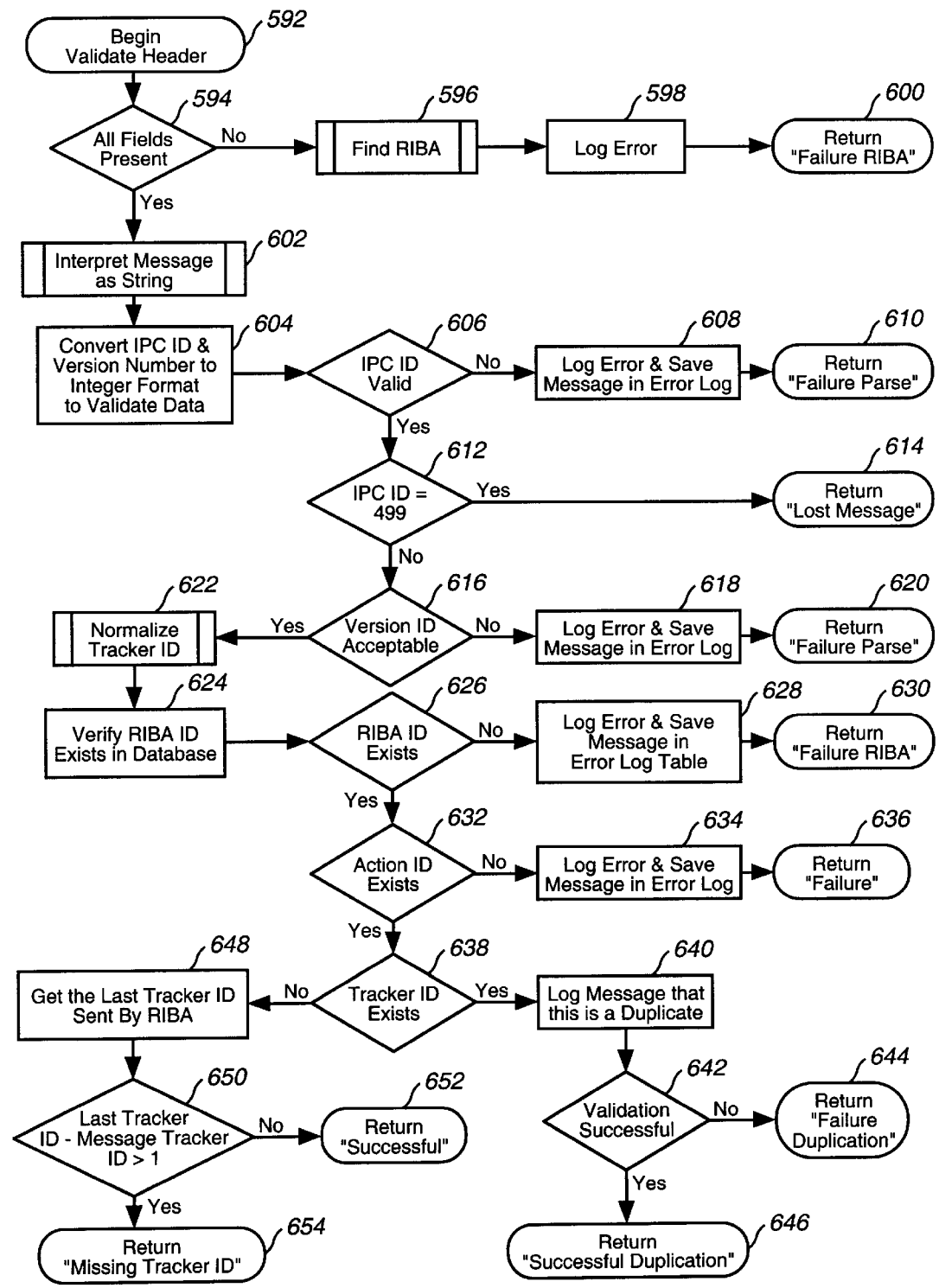

FIG. 10F is a flowchart for the process validate header which is called by step 502 discussed above with regard to FIG. 10C. After starting in step 592, step 594 determines whether all fields are present. When step 594 determines that not all fields are present, step 596 calls a process to find the RIBA, discussed below with regard to step 596 of FIG. 10K. Step 598 then logs an error. Step 600 then returns a value of "Failure RIBA" to the calling step 502 as discussed above with regard to FIG. 10C. When step 594 determines that all fields are present, step 602 interprets the message as a string. Step 604 then converts the IPC ID and Version Number to integer format to validate the data. Step 606 then determines whether the IPC ID is valid. When step 606 determines that the IPC ID is not valid step 608 logs an error and saves the message in an error log. Step 610 then returns a value of "Failure Parse" to the calling step 502 discussed previously with regard to FIG. 10C.

When step 606 determines that the IPC ID is valid, step 612 then determines whether the IPC ID has a value of 499. Then step 612 determines that the IPC ID has a value of 499, step 614 returns a value of "Lost Message" to the calling step 502 discussed previously with regard to FIG. 10C.

When step 612 determines that the IPC ID does not have a value of 499, step 616 determines whether the version ID is acceptable. When step 616 determines that the version ID is not acceptable, step 618 logs an error and saves the message in the error log and step 620 returns a value of "Failure Parse" to the calling step 502 discussed previously with regard to FIG. 10C. When step 616 determines that the version ID is acceptable, step 622 normalizes the Tracker ID. Step 624 then determines that the RIBA ID exists in the IBAR Database 172. Step 626 then determines whether the RIBA ID exists. When step 626 determines that the RIBA ID does not exist in the IBAR Database 172, step 628 logs an error and saves the message in the error log table, and step 630 returns a value of "Failure RIBA" to the calling step 502 discussed previously with regard to FIG. 10C.

When step 626 determines that the RIBA ID exists in the IBAR Database 172, step 632 determines whether an action ID exists. When step 632 determines that an action ID does not exist, step 634 logs an error and saves the message in an error log, and step 636 returns a value of "Failure" to the calling step 502 discussed previously with regard to FIG. 10C.

When step 632 determines that an action ID exists, step 638 determines whether a Tracker ID exists. When step 638 determines that a Tracker ID exists, step 640 logs a message that this is a duplicate. Step 642 then determines whether the validation was successful. When step 642 determines that the validation was not successful, step 644 returns a value of "Failure Duplication" to the calling step 502 discussed previously with regard to FIG. 10C. When step 642 determines that the validation was successful, step 646 returns a value of "Successful Duplication" to the calling step 502 discussed previously with regard to FIG. 10C.

When step 638 determines that the Tracker ID does not exist, step 648 obtains the last Tracker ID sent by the RIBA. Step 650 then determines whether the difference between the last Tracker ID and the Message Tracker ID is greater than 1. When step 650 determines that the difference between the last Tracker ID and the Message Tracker ID is not greater than 1, step 652 returns a value of "Successful" to calling, step 502 discussed previously with regard to FIG. 10C, as it has now been determined that this is the next message to be processed. When step 650 determines that the difference between the last Tracker ID and the Message Tracker ID is greater than 1, step 654 returns a value of "Missing Tracker ID" to the calling step 502 discussed previously with regard to FIG. 10C.

Figure 10G:
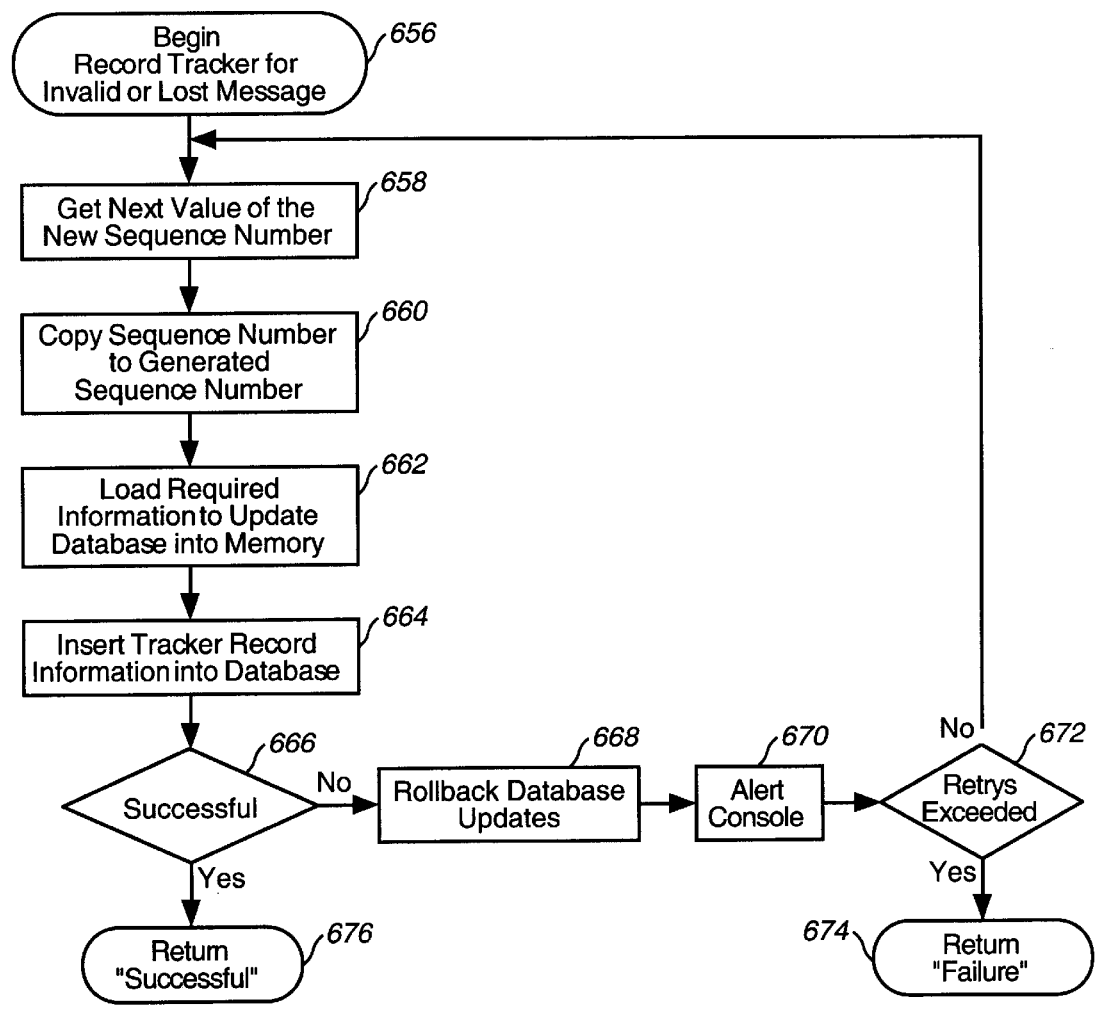

FIG. 10G is a flowchart for the process record tracker for invalid or lost message, which is called by either step 528 or step 538 discussed previously with regard to FIG. 10D. After starting in step 656, step 658 gets the next value of the new sequence number. Step 660 copies the sequence number to the generated sequence number. Step 662 loads required information to update the IBAR Database 172 into memory. Step 664 then inserts the tracker record information into the IBAR Database 172. Step 666 then determines whether the insertion step 664 was successful. When step 666 determines that the insertion step 664 was successful, step 676 returns a value of "Successful" to the appropriate calling step discussed previously with regard to FIG. 10D.

When step 666 determines that the insertion was not successful, step 668 rolls back the database updates. Therefore, when an IBAR Database 172 transaction has failed, all portions are rolled back. Step 670 then alerts the console. Step 672 determines whether the allowable number of retries has been exceeded. When step 672 determines that the allowable number of retries has not been exceeded, control passes to step 658 as discussed above. When step 672 determines that the allows able number of retries has been exceeded, step 674 returns a value of "Failure" to the appropriate calling step as discussed above with regard to FIG. 10D.

Figure 10H:
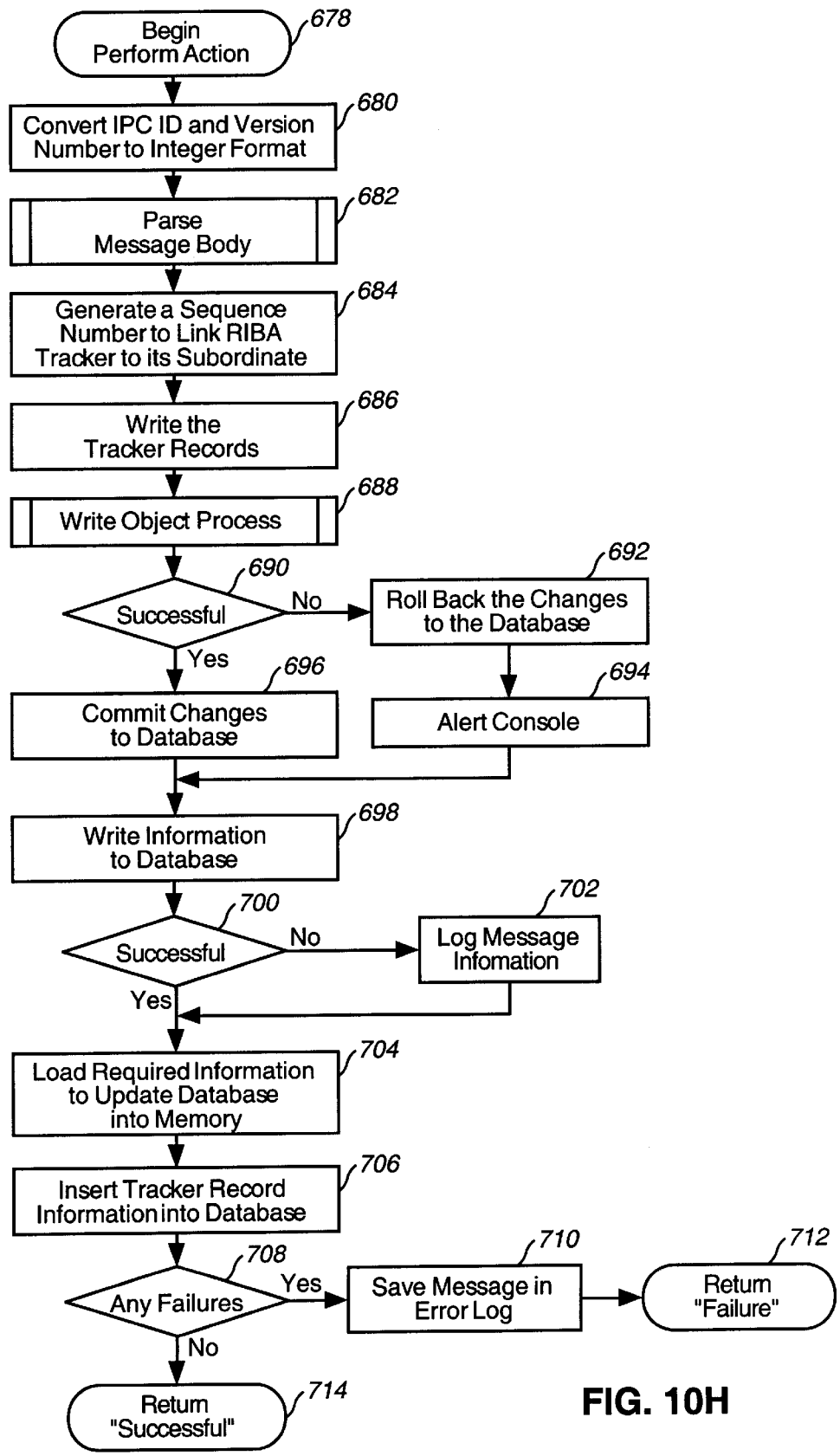

FIG. 10H is a flowchart for the action process which is called by step 560, discussed previously with regard to FIG. 10D. After starting in step 678 step 680 converts the IPC ID and Version Number to integer format. Step 682 calls a process Parse Message Body, discussed below with regard to step 716 of FIG. 10I. Step 684 then generates a sequence number to link the RIBA Tracker to its subordinate, which is an existing subscription version. Step 686 writes the Tracker records to the IBAR Database 172. Step 688 then calls a Write Object Process, discussed below with regard to step 754 of FIG. 10J. Step 690 determines whether a value of "Successful" has been returned. When step 690 determines that a value of "Successful" has been returned, step 696 commits the changes to the IBAR Database 172. Step 698 then writes the information to the IBAR Database 172. Step 700 then determines whether a value of "Successful" has been returned. When step 700 determines that a value of "Successful" has been returned, step 704 loads the required information to update the IBAR Database 172 into memory. Step 706 then inserts the Tracker Record information into the IBAR Database 172. Step 708 determines whether any values of "Failure" have been returned. When step 708 determines that no values of "Failure" have been returned, step 714 returns a value of "Successful" to the calling step 560 of FIG. 10D. When step 708 determines that there has been a failure value returned, step 710 saves the message in the error log, and step 712 returns a value of "Failure" to the calling step 560 of FIG. 10D.

When step 690 determines that a value of "Successful" has not been returned, step 692 rolls back the changes to the database. Step 694 then alerts the console. Control then passes to step 698 as discussed above.

When step 700 determines that a value of "Successful" was not returned, step 702 logs message information. Control then passes to step 704 as discussed above.

Figure 10I:
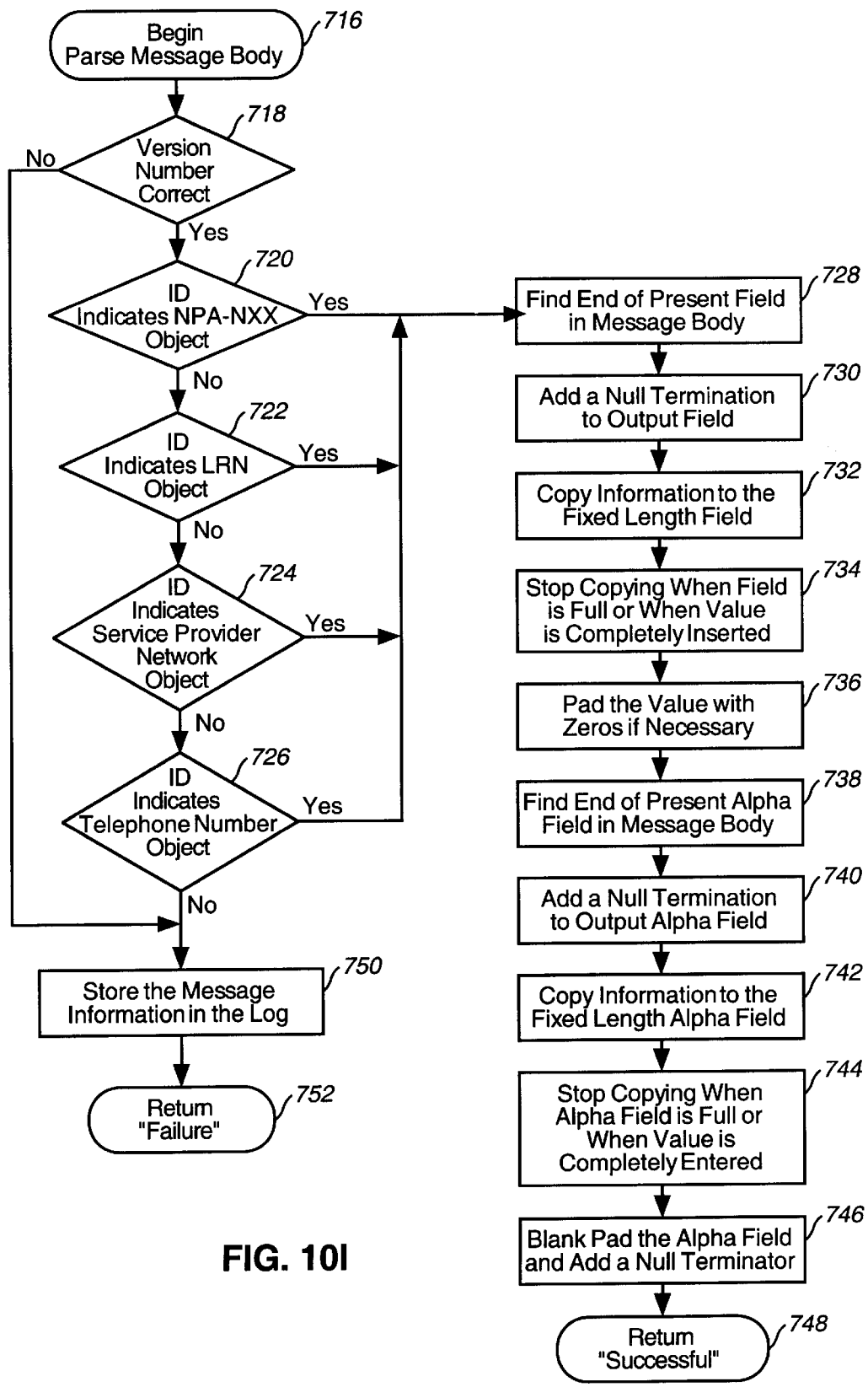

FIG. 10I is a flowchart for the parse message body process which is called by step 682 discussed previously with regard to step 682 of FIG. 10H. After starting in step 716, step 718 determines whether the version number is correct. When step 718 determines that the version number is correct, step 720 then determines whether the ID indicates an NPA-NXX object. When step 720 determines that the ID indicates an NPA-NXX object, step 722 determines whether the ID indicates an LRN object. When step 722 determines that the ID does not indicate an LRN object, step 724 determines whether the ID indicates a Service Provider Network object. When step 724 determines that the ID does not indicate a Service Provider Network object, step 726 determines whether the ID indicates a Telephone Number object. When step 726 determines that the ID does not indicate a Telephone Number object, step 750 stores the message information in the log.

Step 752 then returns a value of "Failure" to the calling step 682 of FIG. 10H.

When step 718 determines that the version number is not correct, control passes to step 750 as discussed above.

When step 720 determines that the ID indicates an NPA-NXX object, step 728 finds the end of the Present Field in the message body. Step 730 then adds a null termination to the output field. Step 732 copies the information to the fixed length field. Step 734 stops copying when the field is full or when the value is completely inserted. Step 736 pads the value with zeros if necessary. Step 738 finds the end of the present alpha field in the message body. Step 740 adds a null termination to the output alpha field. Step 742 copies the information to the fixed length alpha field. Step 744 stops the copying when the alpha field is full or when the value is completely entered. Step 746 blank pads the alpha field and adds a null terminator. Step 748 then returns a value of "Successful" to the calling step 682 of FIG. 10H.

When step 722 determines that the ID indicates an LRN object, control passes to step 728 as discussed above.

When step 724 determines that the ID indicates a Service Provider Network object, control passes to step 728 as discussed above.

When step 726 determines that the ID indicates a Telephone Number object, control passes to step 728 as discussed above.

Figure 10J:
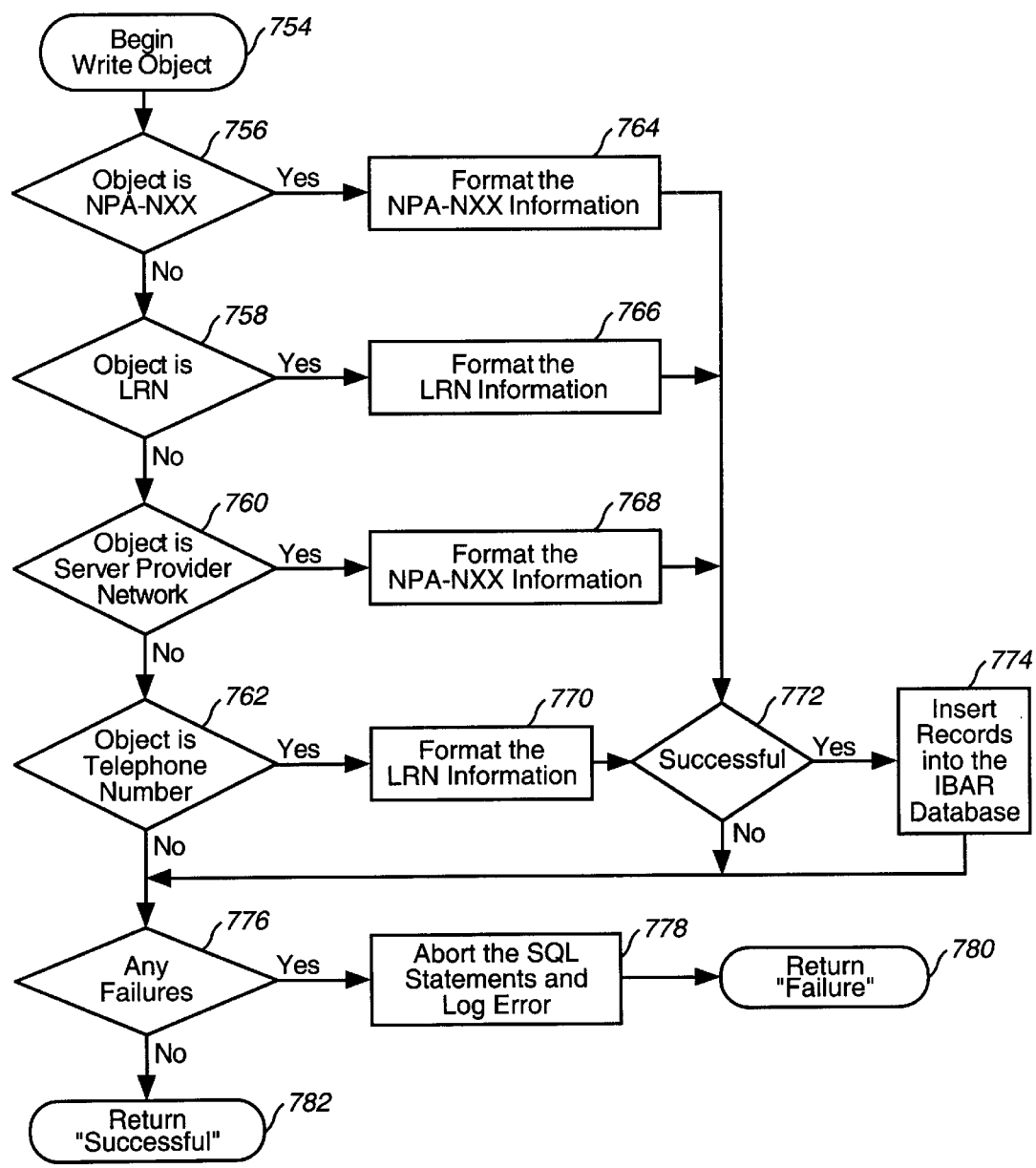

FIG. 10J is a flowchart for the Write Object process which is called by step 688 as discussed previously with regard to FIG. 10H. The process determines the type of LNP software object, or message type, as specified in the "NPAC SMS Interoperable Interface Specification" by Lockheed Martin IMS Corporation, so that the data can be appropriately formatted. After starting in step 754, step 756 determines whether the object type is NPA-NNX. When step 756 determines that the object type is not NPA-NXX, step 758 determines whether the object type is LRN. When step 758 determines that the object type is not LRN, step 760 determines whether the object type is a Service Provider Network. When step 760 determines that the object tape is not a Service Provider Network, step 762 determines whether the object type is a telephone number. When step 762 determines that the object type is not a telephone number, step 776 determines whether any failures have been reported. When step 776 determines that there have been no failures reported, step 782 returns a value of "Successful" to the calling step 688 of FIG. 10H.

When step 756 determines that the object type is Service Provider Network, step 764 formats the NAN-NXX information. Step 772 then determines whether the formatting ", as successful. When step 772 determines that the formatting was successful, step 774 inserts records into the IBAR Database 172, and control passes to step 776 as discussed above.

When step 772 determines that the formatting was not successful, control passes to step 776 as discussed above.

When step 758 determines that the object type is LRN, step 766 formats the LRN information, and control passes to step 772 as discussed above.

When step 760 determines that the object type is Service Provider Network, step 768 formats the NPA-NXX information, and control passes to step 772 as discussed above.

When step 762 determines that the object is type telephone number, step 770 formats the LRN information, and control passes to step 772 as discussed above.

When step 776 determines that there has been at least one failure reported, step 778 aborts the SQL statements and logs the error. Step 780 then returns a value of "Failure" to the calling step 688 of FIG. 10H.

Figure 10K:
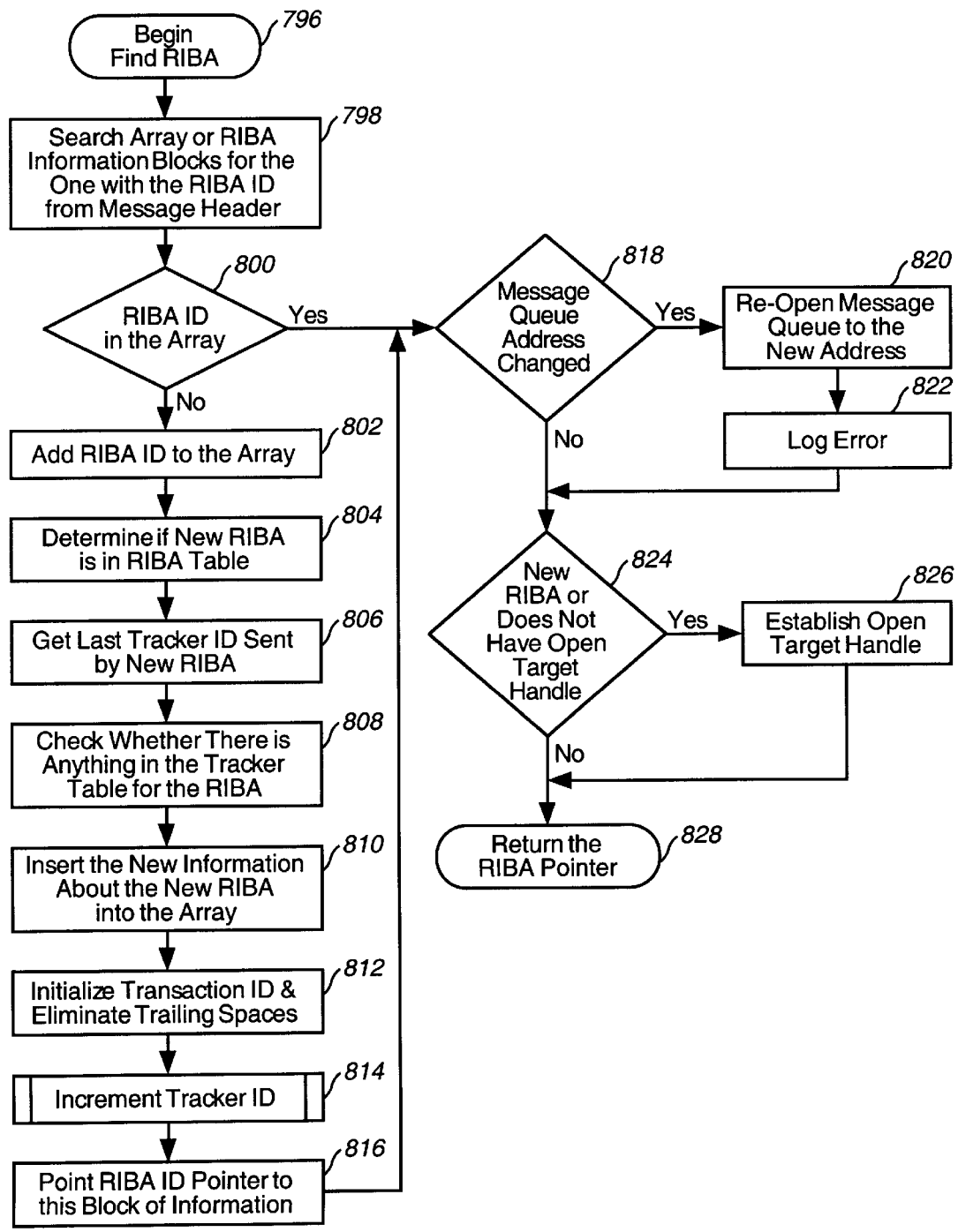

FIG. 10K is a flowchart for the find RIBA process which is called from step 596 as discussed previously with regard FIG. 10F.

After starting in step 796, step 798 searches the RIBA Information array or RIBA Information Blocks in the IBAR Database 172 for the RIBA ID from the message header. Step 800 then determines whether the RIBA ID is in the RIBA Information array. When step 800 determines that the RIBA ID is not in the RIBA Information array, step 802 adds the RIBA ID to the RIBA Information array. Step 804 then determines whether the news RIBA is in the RIBA table. Step 806 then gets the last Tracker ID sent by the new RIBA. Step 808 then checks whether there is anything in the Tracker table for the RIBA. Step 810 then inserts the new information about the new RIBA into the array. Step 812 then initializes the Transaction ID and eliminates trailing spaces. Step 814 then increments the Tracker ID. Step 816 points the RIBA ID pointer to this block of information.

Step 818 then determines whether the RIBA Message Queue address has changed. When step 818 determines that the RIBA Message Queue address has not changed, step 824 determines whether this is a new RIBA or whether the RIBA does not have an open target handle. This determines whether the RIBA is already sending a message, or whether a message is already being processed. When step 824 determines that this is not a new RIBA and that the RIBA has an open target handle, step 828 returns the RIBA pointer to the calling step 596 of FIG. 10F. When step 824 determines that either this is a new RIBA or that the RIBA does not have an open target handle, step 826 establishes an open target handle, and control passes to step 828 as discussed above.

When step 818 determines that the RIBA Message Queue address has changed, step 820 re-opens the RIBA Message Queue to the new address. Step 822 logs an error, and control passes to step 824 as discussed above.

When step 800 determines that the RIBA ID is in the RIBA Information array, control passes to step 818 as discussed above.

Figure 11A:
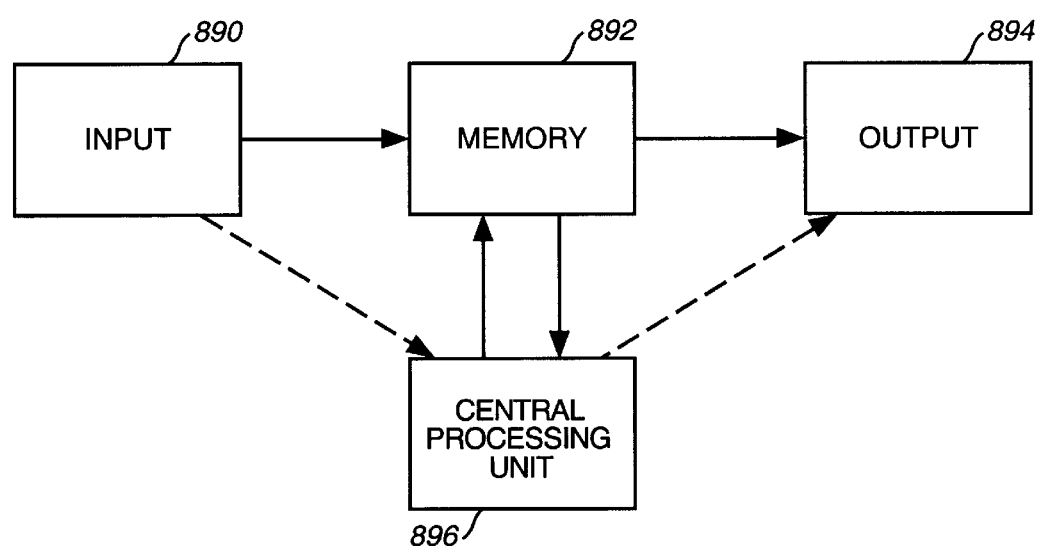
FIG. 11A illustrates an exemplary portion of a generalized computer system upon which portions of the invention may be implemented.

FIG. 11A illustrates an exemplary portion of a generalized computer system upon which portions of the invention may be implemented. For example, the IBAR database 172, the RIBA database 144, and the RIBA IBAR interface 182 may each be implemented by one or more computers having a generalized configuration as exemplified by FIG. 11A. An input 890 communicates with a memos 892 and a Central Processing Unit 896. The Central Processing" Unit 896 communicates with the memory 892 and an output 894. The output 894 is also in communication with the memory 892. The Central Processing Unit 896 may include an arithmetic, logic unit and a control unit in the form of hardware and/or software (not shown). One or more of inputs 890 may each be in communication with one or more memories 892 and/or Central Processing Units 896. One or more Central Processing Units 896 may be in communication with one or more outputs 894 and or memories 892 and or inputs 890. One or more memories 892 may be in communication with one or more inputs 890 and/or Central Processing Units 896 and/or outputs 894. Clearly, a plurality of variations of computer hardware configurations may be realized in a network of computer systems upon which portions of the invention may be implemented.

Figure 11B:
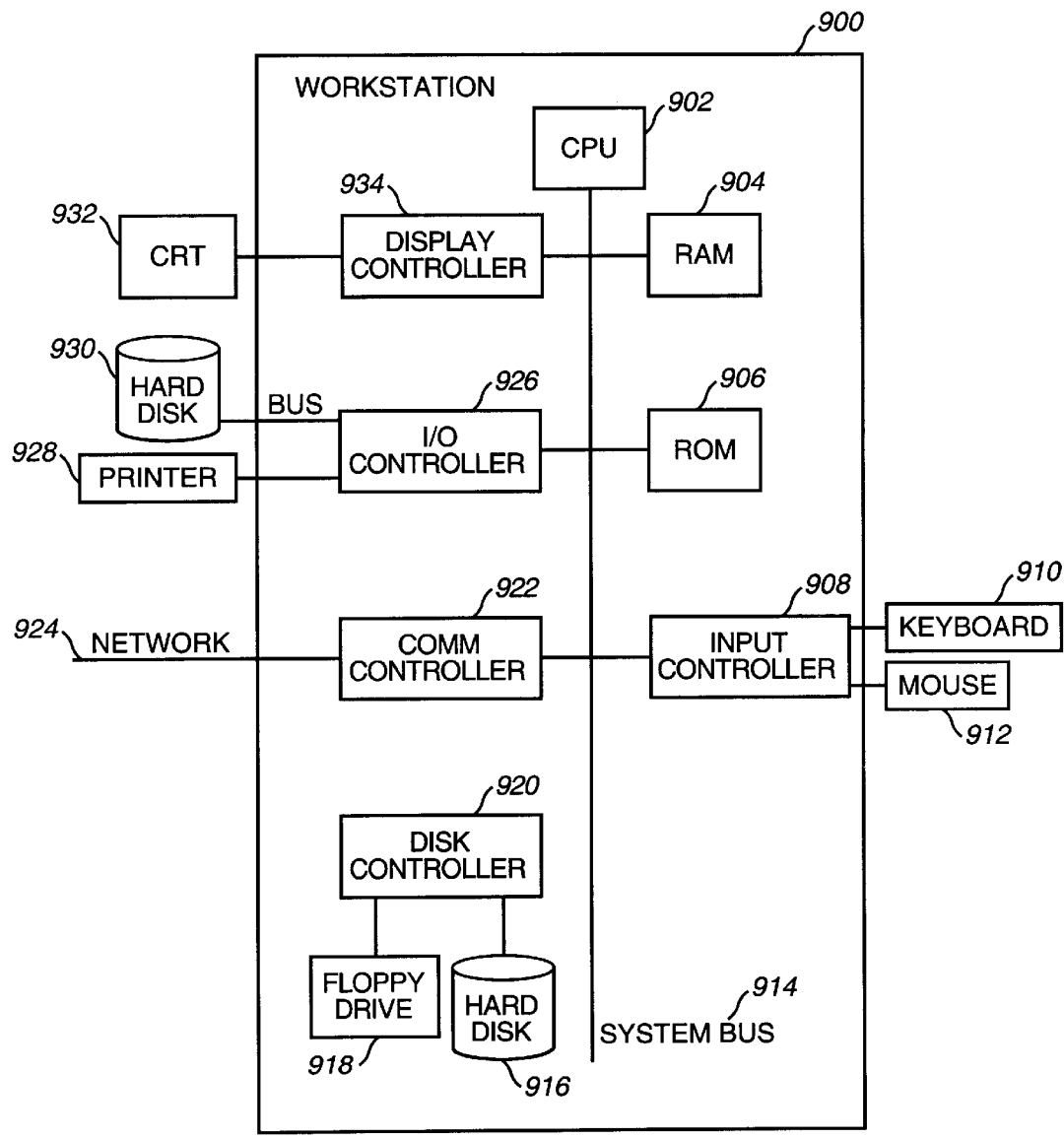
FIG. 11B illustrates an exemplary portion of a generalized hardware configuration, in the format of a workstation, upon which portions of the invention may be implemented.

FIG. 11B illustrates an exemplary portion of a hardware configuration, in the format of a workstation 900, upon which portions of the invention may be implemented. The workstation 900 has component parts a display controller 934, a central processing unit ("CPU") 902, a random access memory ("RAM") 904, a read only memory ("ROM") 906, an input controller 908, connected to a keyboard 910 and a mouse 912, a system bus 914, a hard disk 916 and a floppy drive 918 connected to a disk controller 920, a comm controller 922 connected to a network 924, and an input/output ("I/O") controller 926 connected to a hard disk 930 and a printer 928, and a cathode ray tube ("CRT") 932 connected to the display controller 934. The system bus 914 connects the CPU 902, the RAM 904, the ROM 906, the input controller 908, the disk controller 920, the comm controller 922, the I/O controller 926, and the display controller 934 for transmitting data over the connection line. For example, computer code generated for execution may be loaded into the RAM 904 for execution by the CPU 902, using the system bus 914, with input files stored on the hard disk 930, with other input coming from the keyboard 910 and the mouse 912 through the input controller 908, the network 924 and comm controller 922, and from the hard disk 916 and the floppy drive 918, through the disk controller 920, onto the system bus 914. The system bus 914 interacts with the ROM 906, the network 924, and the comm controller 922.

This invention may be conveniently implemented using a network of conventional general purpose digital computers and or microprocessors programmed according to the teachings of the present specification, as will be apparent to those skilled in the computer art from reading the above descriptions regarding FIGS. 2–9. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is therefore, intended that the appended claims encompass any such modifications or embodiments.

What is claimed is:

1. A computer-implemented method for interfacing a first database to a second database, comprising:

reading a first message unit from said first database, said first message unit including message data and a tracking number;

parsing said first message unit to determine said message data and said tracking number and associate said message data with a task;

storing said message data in said second database according to said task when said tracking number is a next consecutive tracking number;

selecting at least one requestor to which to transmit said message data from said second database; and transmitting said message data to said at least one requestor selected by said step of selecting.

2. A method according to claim 1, wherein said first database includes a regional interface broadcast agent database and said second database includes an interface broadcast agent repository database.

3. A method according to claim 1, wherein said reading from said first database step further comprises the steps of:

storing said first message unit in a message unit list and reading said first message unit from said message unit list.

4. A computer-implemented method for interfacing a regional interface broadcast agent to an interface broadcast agent repository, said method comprising:

reading a first one of a plurality of message units from a message unit list in a memory, said first one of a plurality of message units comprising a header and first message data, said memory coupled to said regional interface broadcast agent;

separately validating said header and said first message data;

parsing said first message unit, when said header and first message data are valid, to associate said first message data from said first message unit with at least one of a plurality of tasks; and storing said first message data from said first message unit in a database based on said parsing, said database associated with said interface broadcast agent repository.

5. A method according to claim 4, wherein said parsing step further comprises the steps of:
   determining whether said first one of said plurality of message units includes NPA message data;
   when it is determined that said first one of said plurality of message units includes NPA message data, acquiring said message data in a corresponding NPA message data format;
   determining whether said first one of said plurality of message units includes LRN message data;
   when it is determined that said first one of said plurality of message units includes LRN message data, acquiring said message data in a corresponding LRN message data format;
   determining whether said first one of said plurality of message units includes service provider network message data;
   when it is determined that said first one of said plurality of message units includes service provider network message data, acquiring said message data in a corresponding service provider network message data format;
   determining whether said first one of said plurality of message units includes telephone number message data; and
   when it is determined that said first one of said plurality of message units includes telephone number message data, acquiring said message data in a corresponding telephone number message data format.

6. A method according to claim 4, further comprising:
   reading a second one of said plurality of message units from said message unit list in said memory;
   verifying that said second one of said plurality of message units is a message unit immediately following said first one of said plurality of message units in said message unit list;
   validating said second one of said plurality of message units;
   parsing said second one of said plurality of message units to associate second message data from said second message unit with at least one of said plurality of tasks; and
   storing said second message data from said second one of said plurality of message units in said database based on said parsing.

7. A system implemented on one or more computers for interfacing a first database to a second database, comprising:
   means for reading a first message unit from said first database, said first message unit including message data;
   means for parsing said first message unit to associate said message data with one of a plurality of tasks;
   means for storing said message data in said second database;
   means for selecting at least one requestor to which to transmit said message data from said second database based on said one of said plurality of task; and
   means for transmitting said message data to said at least one requestor selected by said means for selecting.

8. A system according to claim 7, wherein
   said first database includes a regional interface broadcast agent database and
   said second database includes an interface broadcast agent repository database.

9. A system according to claim 7, wherein said means for reading from said first database further comprises:
   means for storing said first message unit in a message unit list and means for reading said first message unit from said message unit list.

10. A system implemented on one or more computers for interfacing a regional interface broadcast agent to an interface broadcast agent repository, said system comprising:
    means for reading a first one of a plurality of message units, comprising a header and first message data, from a message unit list in a first memory, said first memory accessible to said regional interface broadcast agent;
    means for separately validating said header said first message data;
    means for parsing said first message unit to determine with which of a plurality of tasks said first message data from said first message unit is associated when said header and first message data are valid; and
    means for storing said first message data from said first message unit in a database, said database accessible to said interface broadcast agent repository.

11. A system according to claim 10, wherein said means for parsing further comprises:
    means for determining whether said first one of said plurality of message units includes NPA message data;
    means for acquiring said message data in a corresponding NPA message data format;
    means for determining whether said first one of said plurality of message units includes LRN message data;
    means for acquiring said message data in a corresponding LRN message data format;
    means for determining whether said first one of said plurality of message units includes service provider network message data;
    means for acquiring said message data in a corresponding service provider network message data format;
    means for determining whether said first one of said plurality of message units includes telephone number message data; and
    means for acquiring said message data in a corresponding telephone number message data format.

12. A system according to claim 10, further comprising:
    means for reading a second message unit, comprising a second header and second message data, from said first memory;
    means for verifying that said second message unit is a message unit immediately following said first message unit in said message unit list;
    means for separately validating said second header and said second message data;
    means for parsing said second message unit to determine with which of said plurality to tasks said second message data from said second message unit is associated when said second header and said second message data are valid; and
    means for storing said second message data from said second message unit in said database.

13. A computer program product, including a computer readable medium, for interfacing a first database to a second database, said computer program product comprising:
    means for reading a first message unit from said first database, said first message unit including message data;
    means for parsing said first message unit to determine with which of a plurality of tasks said message data is associated;

means for storing said message data in said second database;

means for selecting at least one requester, based on said associated task, to which to transmit said message data from said second database; and means for transmitting said message data to said at least one requestor selected by said means for selecting.

14. A computer program product according to claim 13, wherein said first database includes a regional interface broadcast agent database and said second database includes an interface broadcast agent repository database.

15. A computer program product according to claim 13, wherein said means for reading from said first database further comprises:

means for storing said first message unit in a message unit list and means for reading said first message unit from said message unit list.

16. A computer program product, including a computer readable medium, for interfacing a regional interface broadcast agent to an interface broadcast agent repository, said computer program product comprising:

means for reading a first message unit, comprising a first header and first message data, from a message unit list in a memory, said memory accessible to said regional interface broadcast agent;

means for smartly validating said first header and said first message data;

means for parsing said first message unit, when said first header and said first message data are valid, to associate said first message data from said first message unit with a task; and means for storing said first message data from said first message unit in a database based on the associated task, said database accessible to said interface broadcast agent repository.

17. A computer program product according to claim 16, wherein said means for parsing further comprises:

means for determining whether said first message unit includes NPA message data;

means for acquiring said message data in a corresponding NPA message data format;

means for determining whether said first message unit includes LRN message data;

means for acquiring said message data in a corresponding LRN message data format;

means for determining whether said first message unit includes service provider network message data;

means for acquiring said message data in a corresponding service provider network message data format;

means for determining whether said first message unit includes telephone number message data; and means for acquiring said message data in a corresponding telephone number message format.

18. A computer program product according to claim 16, further comprising:

means for reading a second message unit, comprising a second header and second message data, from said memory;

means for verifying that said second message unit is a message unit immediately following said first message unit in said message unit list;

means for separately validating said second header and said second message data;

means for parsing said second message unit to associate said second message data from said second message unit with a second task; and means for storing said second message data from said second message unit in said database based on said second task.

* * * * *